(12) United States Patent
Johnson

(10) Patent No.: US 10,978,731 B2
(45) Date of Patent: Apr. 13, 2021

(54) ULTRA HIGH CAPACITY PERFORMANCE BATTERY CELL

(71) Applicant: HHeLi, LLC, Tulsa, OK (US)

(72) Inventor: Paige L. Johnson, Tulsa, OK (US)

(73) Assignee: HHELI, LLC, Tulsa, OK (US)

( * ) Notice: Subject to any disclaimer, the term of this patent is extended or adjusted under 35 U.S.C. 154(b) by 77 days.

(21) Appl. No.: 16/014,738

(22) Filed: Jun. 21, 2018

(65) Prior Publication Data

US 2018/0375146 A1 Dec. 27, 2018

Related U.S. Application Data

(60) Provisional application No. 62/523,143, filed on Jun. 21, 2017.

(51) Int. Cl.

| | |
|---|---|
| H01M 4/48 | (2010.01) |
| H01M 4/52 | (2010.01) |
| H01M 4/36 | (2006.01) |
| H01M 10/04 | (2006.01) |
| H01M 4/131 | (2010.01) |
| H01M 4/134 | (2010.01) |
| H02J 7/00 | (2006.01) |
| H01M 10/44 | (2006.01) |
| H02J 7/04 | (2006.01) |
| H01M 4/62 | (2006.01) |
| H01M 10/0525 | (2010.01) |

(52) U.S. Cl.
CPC ....... *H01M 10/0431* (2013.01); *H01M 4/131* (2013.01); *H01M 4/134* (2013.01); *H01M 4/366* (2013.01); *H01M 4/483* (2013.01); *H01M 4/523* (2013.01); *H01M 4/625* (2013.01); *H01M 10/44* (2013.01); *H02J 7/0036* (2013.01); *H02J 7/045* (2013.01); *H01M 10/0525* (2013.01); *H02J 7/00302* (2020.01)

(58) Field of Classification Search
None
See application file for complete search history.

(56) References Cited

U.S. PATENT DOCUMENTS

| | | | |
|---|---|---|---|
| 4,502,936 | A | 3/1985 | Hayfield |
| 5,296,319 | A | 3/1994 | Bito et al. |
| 5,679,481 | A | 10/1997 | Takanishi et al. |
| 6,007,945 | A | 12/1999 | Jacobs et al. |
| 6,171,571 | B1 | 1/2001 | Bedard et al. |
| 6,670,300 | B2 | 12/2003 | Werpy et al. |
| 6,746,983 | B2 | 6/2004 | Gaffney et al. |
| 6,753,114 | B2 | 6/2004 | Jacobs et al. |

(Continued)

FOREIGN PATENT DOCUMENTS

| | | |
|---|---|---|
| AU | 2007330996 B2 | 6/2008 |
| AU | 2007330996 C1 | 7/2014 |

(Continued)

OTHER PUBLICATIONS

WIPO, "PCT/US18/26961 International Search Report", dated Aug. 27, 2018.

(Continued)

*Primary Examiner* — Wojciech Haske
(74) *Attorney, Agent, or Firm* — GableGotwals

(57) ABSTRACT

A battery comprising a high capacity electrode construction may include layering of the electrode and/or low active material loading.

12 Claims, 20 Drawing Sheets

(56) References Cited

U.S. PATENT DOCUMENTS

| | | |
|---|---|---|
| 7,053,022 B2 | 5/2006 | Gaffney et al. |
| 7,147,834 B2 | 12/2006 | Wong et al. |
| 7,166,263 B2 | 1/2007 | Vanderspurt et al. |
| 7,314,682 B2 | 1/2008 | Thackeray et al. |
| 7,582,276 B2 | 9/2009 | Nonninger |
| 7,611,750 B2 | 11/2009 | Yi et al. |
| 7,612,011 B2 | 11/2009 | Vanderspurt et al. |
| 7,718,568 B2 | 5/2010 | Gaffney et al. |
| 7,732,096 B2 | 6/2010 | Thackeray et al. |
| 7,825,064 B2 | 11/2010 | Wong et al. |
| 8,088,707 B2 | 1/2012 | Kim et al. |
| 8,148,011 B2 | 4/2012 | Thackeray et al. |
| 8,173,827 B2 | 5/2012 | Chang et al. |
| 8,303,841 B2 | 11/2012 | Li et al. |
| 8,318,384 B2 | 11/2012 | Luo et al. |
| 8,383,077 B2 | 2/2013 | Thackeray et al. |
| 8,480,998 B2 | 7/2013 | Hagemeyer et al. |
| 8,493,711 B2 | 7/2013 | Seymour |
| 8,503,162 B2 | 8/2013 | Seymour |
| 8,614,878 B2 | 12/2013 | Seymour |
| 8,658,126 B2 | 2/2014 | Toledo Antonio et al. |
| 8,685,283 B2 | 4/2014 | Wei et al. |
| 8,759,245 B2 | 6/2014 | Chang et al. |
| 8,828,904 B2 | 9/2014 | Wei et al. |
| 8,871,374 B2 | 10/2014 | Vaughey et al. |
| 8,889,078 B2 | 11/2014 | Ji et al. |
| 8,921,257 B2 | 12/2014 | Hazin et al. |
| 8,926,860 B2 | 1/2015 | Sun et al. |
| 8,969,238 B2 | 3/2015 | Fehrmann et al. |
| 9,012,351 B2 | 4/2015 | Yang et al. |
| 9,098,001 B2 | 8/2015 | Tashiro et al. |
| 9,130,226 B2 | 9/2015 | Thackeray et al. |
| 9,786,910 B2 | 10/2017 | Johnson et al. |
| 2002/0086213 A1 | 7/2002 | Utsugi et al. |
| 2003/0065216 A1 | 4/2003 | Tanimoto et al. |
| 2004/0201948 A1* | 10/2004 | Hosoya .................. H01M 4/131 361/305 |
| 2004/0219428 A1 | 11/2004 | Nagayama |
| 2005/0118511 A1 | 6/2005 | Park et al. |
| 2005/0202171 A1 | 9/2005 | Shin |
| 2006/0147808 A1 | 7/2006 | Xiao et al. |
| 2006/0188781 A1 | 8/2006 | Thackeray et al. |
| 2007/0048435 A1 | 3/2007 | Suzuki et al. |
| 2008/0026282 A1 | 1/2008 | Tamura et al. |
| 2008/0272740 A1 | 11/2008 | Martinet et al. |
| 2009/0017378 A1 | 1/2009 | Charest et al. |
| 2009/0027056 A1 | 1/2009 | Huang et al. |
| 2010/0001583 A1 | 1/2010 | Ichikawa |
| 2010/0016443 A1 | 1/2010 | Toledano et al. |
| 2010/0027192 A1 | 2/2010 | Perry et al. |
| 2010/0099031 A1* | 4/2010 | Kato .................. H01M 10/052 429/330 |
| 2010/0129724 A1 | 5/2010 | Kolosnitsyn |
| 2010/0181540 A1 | 7/2010 | Suzuki |
| 2010/0203121 A1 | 8/2010 | Toledano et al. |
| 2011/0033746 A1 | 2/2011 | Liu et al. |
| 2011/0129709 A1 | 6/2011 | Ahn et al. |
| 2011/0206974 A1* | 8/2011 | Inoue .................. H01M 4/043 429/149 |
| 2011/0259244 A1 | 10/2011 | Herbig et al. |
| 2011/0305940 A1 | 12/2011 | Usami |
| 2012/0058397 A1 | 3/2012 | Zhamu et al. |
| 2012/0085978 A1 | 4/2012 | Tashiro et al. |
| 2012/0237819 A1 | 9/2012 | Ahn |
| 2012/0238842 A1 | 9/2012 | Colvin, Jr. et al. |
| 2013/0017340 A1 | 1/2013 | Brown et al. |
| 2013/0026409 A1 | 1/2013 | Baker et al. |
| 2013/0078518 A1 | 3/2013 | Thackeray et al. |
| 2013/0149610 A1 | 6/2013 | Kang et al. |
| 2013/0216911 A1* | 8/2013 | Hosoya .................. H01M 4/362 429/221 |
| 2013/0224603 A1 | 8/2013 | Chen et al. |
| 2013/0255872 A1 | 10/2013 | Zhong |
| 2013/0266872 A1 | 10/2013 | Adamson et al. |
| 2013/0330640 A1 | 12/2013 | Badding et al. |
| 2014/0027670 A1 | 1/2014 | Sun et al. |
| 2014/0187413 A1 | 7/2014 | Lagaron Cabello et al. |
| 2014/0212694 A1 | 7/2014 | Park et al. |
| 2014/0242445 A1 | 8/2014 | Gozdz et al. |
| 2014/0322607 A1 | 10/2014 | Thackeray et al. |
| 2014/0343203 A1 | 11/2014 | Miltner et al. |
| 2015/0044565 A1 | 2/2015 | Wang et al. |
| 2015/0065667 A1 | 3/2015 | Cheng et al. |
| 2015/0069295 A1 | 3/2015 | Ho et al. |
| 2015/0079471 A1 | 3/2015 | Fang et al. |
| 2015/0087505 A1 | 3/2015 | Sanchez Valente et al. |
| 2015/0126774 A1 | 5/2015 | Hiraoka et al. |
| 2015/0140423 A1 | 5/2015 | Brown et al. |
| 2015/0151280 A1 | 6/2015 | Sanchez Valente et al. |
| 2015/0155595 A1 | 6/2015 | Ogihara |
| 2015/0238937 A1 | 8/2015 | Kang et al. |
| 2015/0263342 A1 | 9/2015 | Newbound et al. |
| 2015/0287978 A1 | 10/2015 | Lockett et al. |
| 2015/0303459 A1 | 10/2015 | Kovalenko et al. |
| 2016/0293957 A1 | 10/2016 | Okae et al. |
| 2017/0069931 A1 | 3/2017 | Wang et al. |
| 2017/0141389 A1 | 5/2017 | Johnson et al. |
| 2017/0214079 A1 | 7/2017 | Dai et al. |
| 2018/0138506 A1 | 5/2018 | Johnson |
| 2018/0294479 A1 | 10/2018 | Johnson et al. |
| 2018/0337404 A1 | 11/2018 | Johnson |
| 2018/0337405 A1 | 11/2018 | Johnson |

FOREIGN PATENT DOCUMENTS

| | | |
|---|---|---|
| BR | PI0720068 A2 | 6/2008 |
| CA | 2637436 A1 | 8/2007 |
| CA | 2677185 A1 | 8/2008 |
| CA | 2824842 A1 | 8/2008 |
| CA | 2685475 A1 | 11/2008 |
| CA | 2744601 A1 | 6/2010 |
| CA | 2744601 C | 9/2013 |
| CA | 2677185 C | 12/2013 |
| CA | 2637436 C | 11/2014 |
| CN | 105543961 A | 5/2016 |
| DE | 102013206736 A1 | 10/2014 |
| DE | 102013224206 A1 | 5/2015 |
| EP | 2086678 A1 | 8/2006 |
| EP | 1739139 A1 | 1/2007 |
| EP | 1888311 A2 | 2/2008 |
| EP | 2104558 A2 | 6/2008 |
| EP | 1997169 A1 | 12/2008 |
| EP | 2118208 A2 | 11/2009 |
| EP | 1739139 B1 | 10/2010 |
| EP | 1888311 A4 | 6/2011 |
| EP | 2545776 A2 | 1/2013 |
| EP | 2662914 A2 | 11/2013 |
| EP | 2662915 A2 | 11/2013 |
| EP | 2545776 A3 | 12/2014 |
| EP | 2662914 A4 | 1/2015 |
| EP | 1997169 B1 | 8/2015 |
| KR | 101125593 B1 | 3/2012 |
| WO | 0023510 A1 | 11/2006 |
| WO | 2006124670 A2 | 11/2006 |
| WO | 2007085077 A1 | 8/2007 |
| WO | 2007129842 A1 | 11/2007 |
| WO | 2008066293 A1 | 6/2008 |
| WO | 2008072239 A2 | 6/2008 |
| WO | 2008093347 A2 | 8/2008 |
| WO | 2008131551 A1 | 11/2008 |
| WO | 2015078745 A1 | 6/2015 |
| WO | 2016018738 A1 | 2/2016 |
| WO | 2016030126 A1 | 3/2016 |
| WO | 2016184687 A1 | 11/2016 |
| WO | 2017087404 A1 | 5/2017 |
| WO | 2017087408 A9 | 5/2017 |
| WO | 2017108181 A1 | 6/2017 |

OTHER PUBLICATIONS

KIPO, "PCT/US16/62068 International Search Report and Written Opinion", dated Mar. 2, 2017.

(56) References Cited

OTHER PUBLICATIONS

Jouhannaud et al, "Rapid synthesis of tin (IV) oxide nanoparticles by microwave induced thermohydrolysis", "Journal of Solid State Chemistry 2008", pp. 1439-1444, vol. 181.
Lim et al, "Spherical Tin Oxide, SnO2 Particles Fabricated via Facile Hydrothermal method for Detection of Mercury '(II) Ions", Sep. 1, 2011, pp. 4329-4340, Publisher: International Journal of Electrochemical Science.
Lu et al, "Electrochemical properties of tin oxide anodes for sodium-ion batteries", pp. 287-295, Publisher: Journal of Power Sources 284; 2015.
Lu et al, "Improved electrochemical performance of tin-sulfide anodes for solium-ion batteries", Jun. 24, 2015, Publisher: Journal of Materials Chemistry A.
Mousavand et al, "Supercritical hydrothermal synthesis of organic-Oinorganic hybrid nanoparticles", Mar. 2006, pp. 1445-1446, vol. 41, No. 5, Publisher: Journal of Materials Science.
Munoz et al, "Comparative study of two wet chemical methods of BaSnO3 synthesis: Mechanism of formation of mixed oxide", Apr. 7, 2015, pp. 86-95, vol. 279, Publisher Powder Technology 2015.
Nitta et al, "High-Capacity Anode Materials for Lithium-Ion Batteries: Choice of Elements and Structures of Active Particles", Publisher: www.materialsviews.com; 2013.
KIPO, "PCT/US16/62073 International Search Report and Written Opinion", dated Mar. 2, 2017.
USPTO, "PCT/US17/61866 International Search Report and Written Opinion", dated Jan. 17, 2018.
Queffelec et al, "Surface Modification Using Phosphonic Acids and Esters", pp. 37773807, vol. 112, Publisher: Chemical Reviews; 2012.
Rabuffetti et al, "Synthesis-Dependent Surface Acidity and Structure of SrTiO3 Nanoparticles"pp. 11056-11067, vol. 114, No. 26, Publisher Dept of Chemistry, Northwestern University, J. Phys. Chem; 2010.
Subramanian et al, "Hydrothermal Synthesis and Pseudocapacitance Properties of MnO2 Nanostructures", "The Journal of Physical Chemistry B; Dec. 2005", pp. 20207-20214, vol. 109, No. 43, Publisher: ResearchGate.
Sugunan et al, "Catalysis by some metal oxides modified with phosphate ions", Jun. 3, 2002, pp. 2251-2255, vol. 41A, No. Nov. 2002, Publisher Indian Journal of Chemistry.
Sun et al, "Monodisperse Porous LiFePO4 Microspheres for a High Power Li-Ion Battery Cathode"pp. 2132-2135, vol. 133, No. 7, Publisher Journal of the American Chemical Society; 2011.
Venere, "Nanoparticle network could bring fast-charging batteries", Dec. 3, 2014, Publisher: Purdue University.
Wang et al, "Selected-control hydrothermal synthesis of alpha-and beta-MnO(2) single crystal nanowires", pp. 2880-2881, vol. 124, No. 12, Publisher Journal of the American Chemical Society; Apr. 2002.
Zhang et al, "Nanoscale Magnesium Hydroxide and Magnesium Oxide Powders: Control Over Size, Shape, and Structure via Hydrothermal Synthesis", "ResearchGate", Jan. 2001, pp. 435-440, vol. 13, No. 2, Publisher: Chemistry of Materials.
Zhou et al, "Ultra-Uniform SnOx/Carbon Nanohybrids toward Advanced Lithium-Ion Battery Anodes", "Advanced Materials 2014", pp. 3943-3949, vol. 26, Publisher: wileyonlinelibrary.com.
WIPO, "PCT/US18/52286: International Search Report and Written Opinion", dated Dec. 4, 2018.
Pubchem Open Chemistry Database, "Ammonium Dihydrogen Phosphate", Mar. 22, 2016.
Adschiri et al, "Hydrothermal synthesis of metal oxide nanoparticles at supercritical conditions", pp. 227-235, vol. 3, No. 2, Publisher Journal of Nanoparticle Research; Jun. 2001.
Barbe et al, "Nanocrystalline Titanium Oxide electrodes for Photovoltaic Applications", pp. 3157-3158, 3168, vol. 80, No. 12, Publisher Journal of the American Ceramic Society; 1997.
Briois et al, "Solid-State and Solution Structural Study of Acetylacetone-Modified Tin(IV) Chloride Used as a Precursor of SnO2 nanoparticles Prepared by a Sol-Gel Route", pp. 3885-3894, vol. 16, Publisher: Chem. Mater. 2004.
Chen et al, "Size effect of tin oxide nanoparticles on high capacity lithium battery anode materials", Dec. 15, 2007, pp. 1313-1318, vol. 202, No. 4-7, Publisher Surface and Coatings Technology.
Feng, "The Synthesis and Characterization of Phosphonic Acids for the Surface Modification Study on Indium Tin Oxide", Publisher: A dissertation presented to the Academic Faculty Georgia Institute of Technology; Aug. 2012.
Hino et al, "Reactions of butane and isobutane catalyzed by zirconium oxide treated with sulfate ion. solid superacid catalyst", pp. 6439-6441, vol. 101, No. 21, Publisher 1979 American Chemical Society.
Hofmann et al, "Highly monodisperse water-dispersable iron oxide nanoparticles for biomedical applications", pp. 7842-7853, vol. 20, Publisher: Journal of Materials Chemistry; 2010.
Holland et al, "NMR characterization of phosphonic Acid Capped SnO2 nanoparticles", "Chem. Mater. 2007", Feb. 14, 2007, pp. 2519-2526, vol. 19, Publisher: American Chemical Society.

\* cited by examiner

| Reagents used for synthesis | O | S | Cl | Metal | pH |
|---|---|---|---|---|---|
| Metal-chloride and HCl | 58.6 | - | 2.3 | 27.9 | 2.0 |
| Metal-sulfate and $H_2SO_4$ | 58.3 | 2.0 | - | 26.2 | 1.2 |

FIG. 6

| Reagents used for synthesis | O | P | O-C=O | Metal |
|---|---|---|---|---|
| Metal-acetate and phosphoric acid | 59.6 | 3.0 | 0.4 | 27.3 |

FIG. 10

ULTRA HIGH CAPACITY PERFORMANCE BATTERY CELL

CROSS-REFERENCE TO RELATED CASES

This application claims the benefit of U.S. provisional patent application Ser. No. 62/523,143, filed on Jun. 21, 2017, and incorporates such provisional application by reference into this disclosure as if fully set out at this point.

FIELD OF THE INVENTION

This disclosure is in the field of materials and construction methods useful in chemical energy storage and power devices such as, but not limited to, batteries.

BACKGROUND OF THE INVENTION

Metal oxides are compounds in which oxygen is bonded to metal, having a general formula $M_mO_x$. They are found in nature but can be artificially synthesized. In synthetic metal oxides the method of synthesis can have broad effects on the nature of the surface, including its acid/base characteristics. A change in the character of the surface can alter the properties of the oxide, affecting such things as its catalytic activity and electron mobility. The mechanisms by which the surface controls reactivity, however, are not always well characterized or understood. In photocatalysis, for example, the surface hydroxyl groups are thought to promote electron transfer from the conduction band to chemisorbed oxygen molecules.

Despite the importance of surface characteristics, the metal oxide literature, both scientific papers and patents, is largely devoted to creating new, nanoscale, crystalline forms of metal oxides for improved energy storage and power applications. Metal oxide surface characteristics are ignored and, outside of the chemical catalysis literature, very little innovation is directed toward controlling or altering the surfaces of known metal oxides to achieve performance goals.

The chemical catalysis literature is largely devoted to the creation of "superacids"—acidity greater than that of pure sulfuric acid (18.4 M $H_2SO_4$)—often used for large-scale reactions such as hydrocarbon cracking. Superacidity cannot be measured on the traditional pH scale, and is instead quantified by Hammet numbers. Hammet numbers ($H_0$) can be thought of as extending the pH scale into negative numbers below zero. Pure sulfuric acid has an $H_0$ of −12.

There are, however, many reaction systems and many applications for which superacidity is too strong. Superacidity may, for example, degrade system components or catalyze unwanted side reactions. However, acidity may still be useful in these same applications to provide enhanced reactivity and rate characteristics or improved electron mobility.

The battery literature teaches that acidic groups are detrimental in batteries, where they can attack metal current collectors and housings and cause deterioration in other electrode components. Further, the prior art teaches that an active, catalytic electrode surface leads to electrolyte decomposition which can result in gas generation within the cell and ultimately in cell failure.

A need exists for battery implementation having a synthetic metal oxide that is acidic but not superacidic at least on its surface and is deployed within the anode and/or cathode. Further, existing battery construction techniques should be updated to take full advantage of the new materials available according to the present disclosure, as well as taking advantage of gains and improvements that may be realized using such construction techniques with previously known materials.

SUMMARY OF THE INVENTION

Embodiments of an ultra-high capacity battery cell have a lithiation capacity of at least 4000 mAhr/g and comprise an electrode that includes a layer containing a nanoparticle-sized metal oxide in a range of 20% to 40% by weight, and a nanoparticle-sized conductive carbon in a range of 20% to 40% by weight. In a particular embodiment, the metal oxide and the conductive carbon are each 33% by weight. In further embodiments, the metal oxide and the conductive carbon are each 20-25% by weight. In a further particular embodiment, the metal oxide and the conductive carbon are each 21% by weight. The electrode may be arranged as an anode or cathode.

The battery cell may include least one other layer also containing the nanoparticle-sized conductive carbon and arranged adjacent to the layer containing the nanoparticle sized metal oxide. In some embodiments, this other layer is both above and below the layer containing the nanoparticle-sized metal oxide. The nanoparticle-sized metal oxide may be an acidified metal oxide having, at least on its surface, a pH<5 when measured in water at 5% wgt., and a Hammett function>−12 (hereafter, an acidified metal oxide, or "AMO"). In other embodiments, a metal oxide may be used in construction of the cell or battery that is not acidified, not substantially acidified, or not functionalized with an acidic group (here after a non-acidified metal oxide, or "non-AMO"). Collectively, AMO's and non-AMOs may be referred to simply as metal oxides.

This disclosure describes materials corresponding to AMOs, non-AMOs, and applications for using both. Applications include, without limitation, battery electrode materials, as catalysts, as photovoltaic or photoactive components, and sensors. Techniques for preparing AMOs and non-AMOs and devices comprising either are further disclosed. The disclosed AMOs are optionally used in combination with acidic species to enhance their utility.

This application further describes high capacity electrochemical cells including electrodes comprising AMOs and non-AMOs. Techniques for preparing metal oxides and electrochemical cells comprising metal oxides are further disclosed. Optionally, the disclosed metal oxides are used in conjunction with conductive materials to form electrodes. The formed electrodes are useful with metallic lithium and conventional lithium ion electrodes as the corresponding counter electrodes. The disclosed metal oxides are optionally used in combination with acidic species to enhance their utility.

In some embodiments, the present disclosure provides for layered electrode constructions of low active material (i.e., metal oxide) loading. In some cases, less than 80%, by weight of active material is utilized in the electrode. This contrasts with conventional electrochemical cell technology in which the loading of active material is attempted to be maximized, and may be greater than or about 80%, by weight, e.g., 90% or 95% or 99%. While high active material loading may be useful for increasing capacity in conventional electrochemical cell technology, the inventors of the present application have found that reducing the active material loading actually permits higher cell capacities with various embodiments according to the present disclosure. Such capacity increase may be achieved, at least in part, by allowing for larger uptake of shuttle ions (i.e., lithium ions)

since additional physical volume may be available when the active material loading levels are lower. Such capacity increase may alternatively or additionally, at least in part, be achieved by allowing for more active sites for uptake of shuttle ions and less blocking of active sites by additional material mass.

The metal oxides described include those in the form of a nanomaterial, such as a nanoparticulate form, which may be monodispersed or substantially monodispersed and have particle sizes less than 100 nm, for example. The disclosed AMOs exhibit low pH, such as less than 7 (e.g., between 0 and 7), when suspended in water or resuspended in water after drying, such as at a particular concentration (e.g., 5 wt. %), and further exhibit a Hammett function, H0, that is greater than −12 (i.e., not superacidic), at least on the surface of the AMO.

The surface of the AMOs may optionally be functionalized, such as by acidic species or other electron withdrawing species. Synthesis and surface functionalization may be accomplished in a "single-pot" hydrothermal method in which the surface of the metal oxide is functionalized as the metal oxide is being synthesized from appropriate precursors. In some embodiments, this single-pot method does not require any additional step or steps for acidification beyond those required to synthesize the metal oxide itself, and results in an AMO material having the desired surface acidity (but not superacidic).

Optionally, surface functionalization occurs using strong electron-withdrawing groups ("EWGs")—such as $SO_4$, $PO_4$, or halogens (Br, Cl, etc.)—either alone or in some combination with one another. Surface functionalization may also occur using EWGs that are weaker than $SO_4$, $PO_4$, or halogens. For example, the synthesized metal oxides may be surface-functionalized with acetate ($CH_3COO$), oxalate ($C_2O_4$), and citrate ($C_6H_5O_7$) groups.

Despite the conventional knowledge that acidic species are undesirable in batteries because they can attack metal current collectors and housings and cause deterioration in other electrode components, and that active, catalytic electrode surfaces can lead to electrolyte decomposition, gas generation within the cell, and ultimately in cell failure, the inventors have discovered that acidic species and components can be advantageous in batteries employing AMO materials in battery electrodes.

For example, the combination or use of metal oxides with acidic species can enhance the performance of the resultant materials, systems or devices, yielding improved capacity, cyclability, and longevity of devices. As an example, batteries employing acidic electrolytes or electrolytes containing acidic species as described herein exhibit considerable gains in capacity, such as up to 100 mAh/g or more greater than similar batteries employing non-acidified electrolytes or electrolytes lacking acidic species. In some embodiments, improvements in capacity between 50 and 300 mAh/g may be achieved. In addition, absolute capacities of up to 1000 mAh/g or more are achievable using batteries having acidified electrolytes or electrolytes including acidic species. Moreover, cycle life of a battery may be improved through the use of acidic electrolytes or electrolytes containing acidic species, such as where a battery's cycle life is extended by up to 100 or more charge-discharge cycles.

An example battery cell comprises a first electrode, such as a first electrode that comprises a metal oxide (optionally an AMO nanomaterial), a conductive material, and a binder; a second electrode, such as a second electrode that includes metallic lithium; and an electrolyte positioned between the first electrode and the second electrode. Optionally, the metal oxide comprises less than 80 weight percent of the first electrode. Example electrolytes include those comprising a metal salt dissolved in a solvent, solid electrolytes, and gel electrolytes. Optionally, a separator is positioned between the first electrode and the second electrode.

In addition or alternatively, batteries including an electrode, such as a cathode or anode, that is itself acidic or that includes acidic species, such as an organic acid, may also be beneficial and, again, contrary to the conventional teaching in battery technology. For example, batteries incorporating acidic electrodes or acidic species within the electrode may enhance the performance and yield improved capacity, cyclability, and longevity. Capacity gains of up to 100 mAh/g or greater are achievable. Cycle life of a battery may also be improved through the use of acidic electrodes or electrodes containing acidic species, such as where a battery's cycle life is extended by up to 100 or more cycles. As an example, an acidic electrode or an electrode that includes acidic species may exhibit a pH less than 7 (but not be superacidic), such as when components of the electrode are suspended in water (or resuspended in water after drying) at 5 wt. %.

Electrodes corresponding to the present disclosure may comprises a layered structure including a first set of layers comprising a conductive material and a second set of layers comprising the metal oxide. Optionally, the first set of layers and the second set of layers may be provided in an alternating configuration. Optionally, the first set of layers and the second set of layers independently comprises between 1 and 20 layers. Optionally, the first set of layers and the second set of layers independently have thicknesses of between 1 µm and 50 µm, between 2 µm and 25 µm, between 3 µm and 20 µm, between 4 µm and 15 µm, or between 5 µm and 10 µm. Optionally, the metal oxide comprises between 5 and 90 weight percent of the second set of layers, such as 5, 10, 15, 20, 25, 30, 35, 40, 45, 50, 55, 60, 65, 70, 75, 80, 85, or 90 weight percent. Optionally, the conductive material and the binder each independently comprise between 5 and 90 weight percent of the first set of layers such as 25, 10, 15, 20, 25, 30, 35, 40, 45, 50, 55, 60, 65, 70, 75, 80, 85, or 90 weight percent.

A first electrode optionally comprises the metal oxide at up to 95 weight percent of the first electrode, up to 80 weight percent of the first electrode, up to 70 weight percent of the first electrode, between 1 and 50 weight percent of the first electrode, between 1 and 33 weight percent of the first electrode, between 15 and 25 weight percent of the first electrode, between 55 and 70 weight percent of the first electrode, between 20 and 35 weight percent of the first electrode, between 5 and 15 weight percent of the first electrode. Specific examples of metal oxide weight percent for the first electrode include 1%, 5%, 11%, 12%, 13%, 14%, 21%, 22%, 23%, 24%, 25%, 26%, 27%, 28%, 29%, 30%, 31%, 32%, 33%, 60%, 61%, 62%, 63%, 64%, 65%, etc. Without limitation loadings (percent metal oxide) of the electrode may range from 1-95%, 10-80%, 20-70%; 30-40%; 40-50%; 50-60%; 60-70%; or 80-100%. In various embodiments, the loading values may vary by +/−1%, 2%, 5%, or 10%. Optionally, the conductive material and the binder each independently comprise the majority of the remainder of the first electrode. For example, the conductive material and the binder each independently comprise between 10 and 74 weight percent of the first electrode. Optionally, the conductive material and the binder each together comprise between 20 and 90 weight percent of the first electrode. Optionally, an AMO nanomaterial is added as a dopant of 1-10% by weight to a conventional lithium ion electrode, such as graphite, lithium cobalt oxide, etc.

Various materials are useful for the electrodes described herein. Example metal oxides include, but are not limited to, a lithium containing oxide, an aluminum oxide, a titanium oxide, a manganese oxide, an iron oxide, a zirconium oxide, an indium oxide, a tin oxide, an antimony oxide, a bismuth oxide, or any combination of these. Optionally, the oxides are in the form of an AMO. As described herein, the metal oxide optionally comprises and/or is surface functionalized by one or more electron withdrawing groups selected from Cl, Br, $BO_3$, $SO_4$, $PO_4$, $NO_3$, $CH_3COO$, $C_2O_4$, $C_2H_2O_4$, $C_6H_8O_7$, or $C_6H_5O_7$. Example conductive material comprises one or more of graphite, conductive carbon, carbon black, Ketjenblack, or conductive polymers, such as poly (3,4-ethylenedioxythiophene) (PEDOT), polystyrene sulfonate (PSS), PEDOT:PSS composite, polyaniline (PANI), or polypyrrole (PPY).

In some embodiments, electrodes comprising AMO nanomaterials are used in conjunction with other electrodes to form a cell. For example, a second electrode of such a cell may comprise graphite, metallic lithium, sodium metal, lithium cobalt oxide, lithium titanate, lithium manganese oxide, lithium nickel manganese cobalt oxide (NMC), lithium iron phosphate, lithium nickel cobalt aluminum oxide (NCA), an AMO nanomaterial, or any combination of these. In a specific embodiment, the first electrode comprises an $SnO_2$ (in AMO or non-AMO form), and the second electrode comprises metallic lithium.

Various materials are useful for the electrodes described herein. Example metal oxides include, but are not limited to, a lithium containing oxide, an aluminum oxide, a titanium oxide, a manganese oxide, an iron oxide, a zirconium oxide, an indium oxide, a tin oxide, an antimony oxide, a bismuth oxide, or any combination of these. Optionally, the oxides are in the form of an AMO. As described herein, the metal oxide optionally comprises and/or is surface functionalized by one or more electron withdrawing groups selected from Cl, Br, $BO_3$, $SO_4$, $PO_4$, $NO_3$, $CH_3COO$, $C_2O_4$, $C_2H_2O_4$, $C_6H_8O_7$, or $C_6H_5O_7$. Example, conductive material comprises one or more of graphite, conductive carbon, carbon black, Ketjenblack, or conductive polymers, such as poly (3,4-ethylenedioxythiophene) (PEDOT), polystyrene sulfonate (PSS), PEDOT:PSS composite, polyaniline (PANI), or polypyrrole (PPY).

In various embodiments, high capacity battery cells comprise a first electrode including a metal oxide nanomaterial, a conductive material, and a binder; a second electrode; and an electrolyte positioned between the first electrode and the second electrode, where the metal oxide nanomaterial comprises 5-15, 20-35, or 55-70 weight percent of the first electrode, where the metal oxide nanomaterial comprises 0-15% by weight of iron oxide and 85-100% by weight of tin oxide. In some embodiment, metal oxide comprises and/or is surface functionalized by one or more electron withdrawing groups, where the conductive material comprises one or more of graphite, conductive carbon, carbon black, Ketjenblack, and conductive polymers, such as poly (3,4-ethylenedioxythiophene) (PEDOT), polystyrene sulfonate (PSS), PEDOT:PSS composite, polyaniline (PAM), or polypyrrole (PPY), where the second electrode comprises or includes metallic lithium.

Such a high capacity battery cell may exhibit a life cycle of 100 to 1000 charge-discharge cycles without failure, and an open circuit voltage upon assembly of between 2 V and 4 V. Optionally, the first electrode comprises a layered structure including a first set of layers the conductive material and a second set of layers comprising the metal oxide nanomaterial, such as where the first set of layers and the second set of layers are provided in an alternating configuration, where the first set of layers comprises between 1 and 20 layers and where the second set of layers comprises between 1 and 20 layers, where the first set of layers and the second set of layers independently have thicknesses of between 1 μm and 50 μm, where the metal oxide nanomaterial comprises between 5 and 70 weight percent of the second set of layers.

As a further example, batteries in which the electrode is formed using a slurry may also be beneficial and contrary to the conventional teaching in battery technology. As described herein, the metal oxide may optionally be formed into battery electrode by first forming a slurry of the metal oxide with one or more binder compounds, solvents, additives (e.g., conductive additives or acidic additives), and/or other wet processing materials. The slurry may be deposited on a conductive material or current collector in order to form an electrode. Such a slurry and/or a solvent may optionally be acidic or include acidic species and, again, allow for improvements in capacity, cyclability, and longevity of the resultant battery. Optionally, all or a portion of the solvent may be evaporated, leaving the metal oxide material, binder, additives, etc. The resultant material (in the case of using an AMO) may optionally exhibit its own acidity, such having a pH less than 7 (but not superacidic), when suspended in water (or resuspended in water after drying) at 5 wt. %, for example.

Various techniques may be used for making the metal oxide. Optionally, making a metal oxide comprises forming a solution comprising a metal salt, ethanol, and water; acidifying the solution by adding an acid to the solution; basifying the solution by adding an aqueous base to the solution; collecting precipitate from the solution; washing the precipitate; and drying the precipitate.

Optionally, making an electrode further comprises depositing a further conductive layer over the electrode layer, such as a conductive layer that comprises a second conductive material. Optionally, depositing the conductive layer include forming a conductive slurry using the second conductive material, a second binder, and a second solvent; depositing a conductive slurry layer on the electrode layer; and evaporating at least a portion of the second solvent to form the conductive layer. Optionally, making an electrode comprises forming 1-20 additional conductive layers comprising the conductive material and 1-20 additional electrode layers comprising the metal oxide. For example, an electrode may comprise a layered structure including a first set of layers comprising a second conductive material and a second set of layers comprising the metal oxide, such as where the first set of layers and the second set of layers are provided in an alternating configuration. Example layers include those independently having thicknesses of between 1 μm and 50 μm. Example layers include those comprising between 10 and 90 weight percent of the metal oxide. Example layers include those independently comprising between 5 and 85 weight percent of the conductive material and/or binder.

Electrodes formed using the methods of this aspect may have a metal oxide content of up to 80 weight percent. Electrodes formed using the methods of this aspect may have a conductive material and/or binder content of between 10 and 70 weight percent of the electrode.

As described above, acidic species may optionally be included as an additive to any of the components of a battery, such as an electrode or an electrolyte. Optionally, a battery comprising a metal oxides according to the present disclosure may include an electrolyte positioned between the electrodes in which acidic species are dissolved in a solvent. Such an electrolyte may also be referred to herein as an acidified electrolyte. The electrolyte may optionally include one or more lithium salts dissolved in the solvent, such as $LiPF_6$, $LiAsF_6$, $LiClO_4$, $LiBF_4$, $LiCF_3SO_3$, and combinations of these. It will be appreciated that the electrolyte may be positioned not only in the space separating the electrodes (i.e., between the electrodes), but may also penetrate through or into pores of the electrodes and/or through or into pores of any materials or structures optionally positioned between the electrodes, such as a separator.

Example acidic species useful with the AMOs, electrodes, and electrolytes described herein include but are not limited to organic acids, such as carboxylic acids. Example acidic species include those exhibiting a pKa in water of between −10 and 7, between −5 and 6, between 1 and 6, between 1.2 and 5.6, or about 4. Specific example organic acids include, for example, oxalic acid, carbonic acid, citric acid, maleic acid, methylmalonic acid, formic acid, glutaric acid, succinic acid, methylsuccinic acid, methylenesuccinic acid, citraconic acid, acetic acid, benzoic acid. Example organic acids include dicarboxylic acids, such as those having a formula of

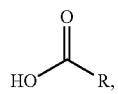

where R is a substituted or unsubstituted C1-C20 hydrocarbon, such as a substituted or unsubstituted alkyl group, a substituted or unsubstituted alkenyl group, a substituted or unsubstituted aromatic or heteroaromatic, a substituted or unsubstituted amine, etc. Example organic acids also include those having a formula of

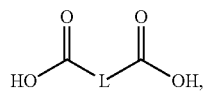

where L is a substituted or unsubstituted C1-C20 divalent hydrocarbon, such as a substituted or unsubstituted alkylene group, a substituted or unsubstituted arylene group, a substituted or unsubstituted heteroarylene group, a substituted or unsubstituted amine, etc. Organic acids may include organic acid anhydrides, such as having a formula of

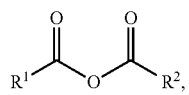

where $R^1$ and $R^2$ are independently a substituted or unsubstituted C1-C20 hydrocarbon, such as a substituted or unsubstituted alkyl group, a substituted or unsubstituted alkenyl group, a substituted or unsubstituted aromatic or heteroaromatic group, a substituted or unsubstituted amine, etc. Optionally, $R^1$ and $R^2$ can form a ring. Example organic acid anhydrides include any anhydrides of the above mentioned organic acids. Specific organic acid anhydrides include, but are not limited to glutaric anhydride, succinic anhydride, methylsuccinic anhydride, maleic anhydride, and itaconic anhydride.

Useful concentrations of the acidic species in either or both the electrolyte and the AMO electrode include from 0 wt. % to 10 wt. %, 0.01 wt. % to 10 wt. %, from 0.1 wt. % to 10 wt. %, from 1 wt. % to 5 wt. %, or from 3 wt. % to 5 wt. %.

Useful solvents include those employed in lithium ion battery systems, for example, such as ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Other useful solvents will be appreciated to those skilled in the art. Optionally, when an acidic species and metal salt are dissolved in a solvent to form an electrolyte, the electrolyte itself exhibits an acidic condition (i.e., pH less than 7).

Example binders useful with the batteries and electrodes described herein include Styrene Butadiene Copolymer (SBR), Polyvinylidene Fluoride (PVDF), Carboxy methyl cellulose (CMC), Styrene Butadiene Rubber (SBR), acrylonitrile, polyacrylic acid (PAA), polyvinyl alcohol (PVA), polyamide imide (PAI), and any combination of these. Optionally, conductive polymers may be useful as a binder.

Other example additives useful with the AMOs and electrodes described herein include, but are not limited to conductive additives. Example conductive additives include graphite, conductive carbon, carbon black, Ketjenblack, and conductive polymers, such as poly (3,4-ethylenedioxythiophene (PEDOT), polystyrene sulfonate (PSS), PEDOT:PSS composite, polyaniline (PAM), and polypyrrole (PPY). Conductive additives may be present, for example, in an electrode, at any suitable concentration such as at weight percent greater than 0 and as high as 35 wt. %, 40 wt. % or more. Optionally, conductive additives are present in an electrode at a range of 1 wt. % to 95 wt. %, 1 wt. % to 35 wt. %, 1 wt. % to 25 wt. %, 5 wt. % to 40 wt. %, 10 wt. % to 40 wt. %, 15 wt. % to 40 wt. %, 20 wt. % to 40 wt. %, 25 wt. % to 40 wt. %, 30 wt. % to 40 wt. %, 35 wt. % to 40 wt. %, 40 wt. % to 45 wt. %, 40 wt. % to 50 wt. %, 40 wt. % to 55 wt. %, 40 wt. % to 60 wt. %, 40 wt. % to 65 wt. %, 40 wt. % to 70 wt. %, 40 wt. % to 75 wt. %, 40 wt. % to 80 wt. %, 40 wt. % to 85 wt. %, 40 wt. % to 90 wt. %, or 40 wt. % to 95 wt. %.

Methods of making batteries are also described herein. An example method of making a battery comprises making a metal oxide nanomaterial; forming a first electrode of or comprising the nanomaterial; forming an electrolyte by dissolving one or more metal salts in a solvent; and positioning the electrolyte between the first electrode and a second electrode. Another example method of making a battery comprises making a metal oxide nanomaterial; forming a first electrode of or comprising the nanomaterial and one or more metal salts; and positioning the electrolyte between the first electrode and a second electrode.

Electrolytes for use in batteries are also disclosed herein. For example, the disclosed electrolytes are useful in batteries comprising a first electrode and a second electrode. Example electrolytes comprise a solvent and one or more metal salts dissolved in the solvent. Optionally, an acidic species is dissolved in the solvent, such as an acidic species that is different from the one or more metal salts.

As described above, a variety of acidic species are useful in the disclosed electrolytes, such as an acidic species comprising an organic acid and/or an organic acid anhydride. Example organic acids include, but are not limited to, oxalic acid, acetic acid, citric acid, maleic acid, methylmalonic acid, glutaric acid, succinic acid, methylsuccinic acid, methylenesuccinic acid, citraconic acid, or any combination of these. Example organic acid anhydrides include, but are not limited to glutaric anhydride, succinic anhydride, methylsuccinic anhydride, maleic anhydride, itaconic anhydride, or any combination of these. Other acidic species examples are described above. Useful acidic species include, but are not limited to, those exhibiting a pKa of between −10 and 7, between −5 and 6, between 1 and 6, between 1.2 and 5.6, or about 4. The acidic species may optionally be present in the electrolyte at any suitable concentration, such as from 0.01 wt. % to 10 wt. %, from 0.1 wt. % to 10 wt. %, from 1 wt. % to 5 wt. %, or from 3 wt. % to 5 wt. %.

It will be appreciated that lithium metal salts, such as $LiPF_6$, $LiAsF_6$, $LiClO_4$, $LiBF_4$, $LiCF_3SO_3$, may be useful components of the disclosed acidified electrolytes. Example solvents include, but are not limited to, ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Example solvents may be useful in metal ion batteries, such as lithium ion batteries.

BRIEF DESCRIPTION OF THE DRAWINGS

FIG. 6 is X-ray photoelectron spectroscopy (XPS) data showing surface functionalization arising endogenously from the synthesis method disclosed herein. Numbers shown are atomic concentrations in %. The far-right column lists the corresponding pH of the synthesized nanoparticles as measured when dispersed at 5 wt % in aqueous solution.

FIG. 10 provides X-ray photoelectron spectroscopy analysis of the surface of AMO nanoparticles synthesized using both a strong (phosphorous containing) and weak (acetate) electron withdrawing group shows greater atomic concentration of phosphorous than of the bonds associated with acetate groups.

DEFINITIONS

Figure 1:
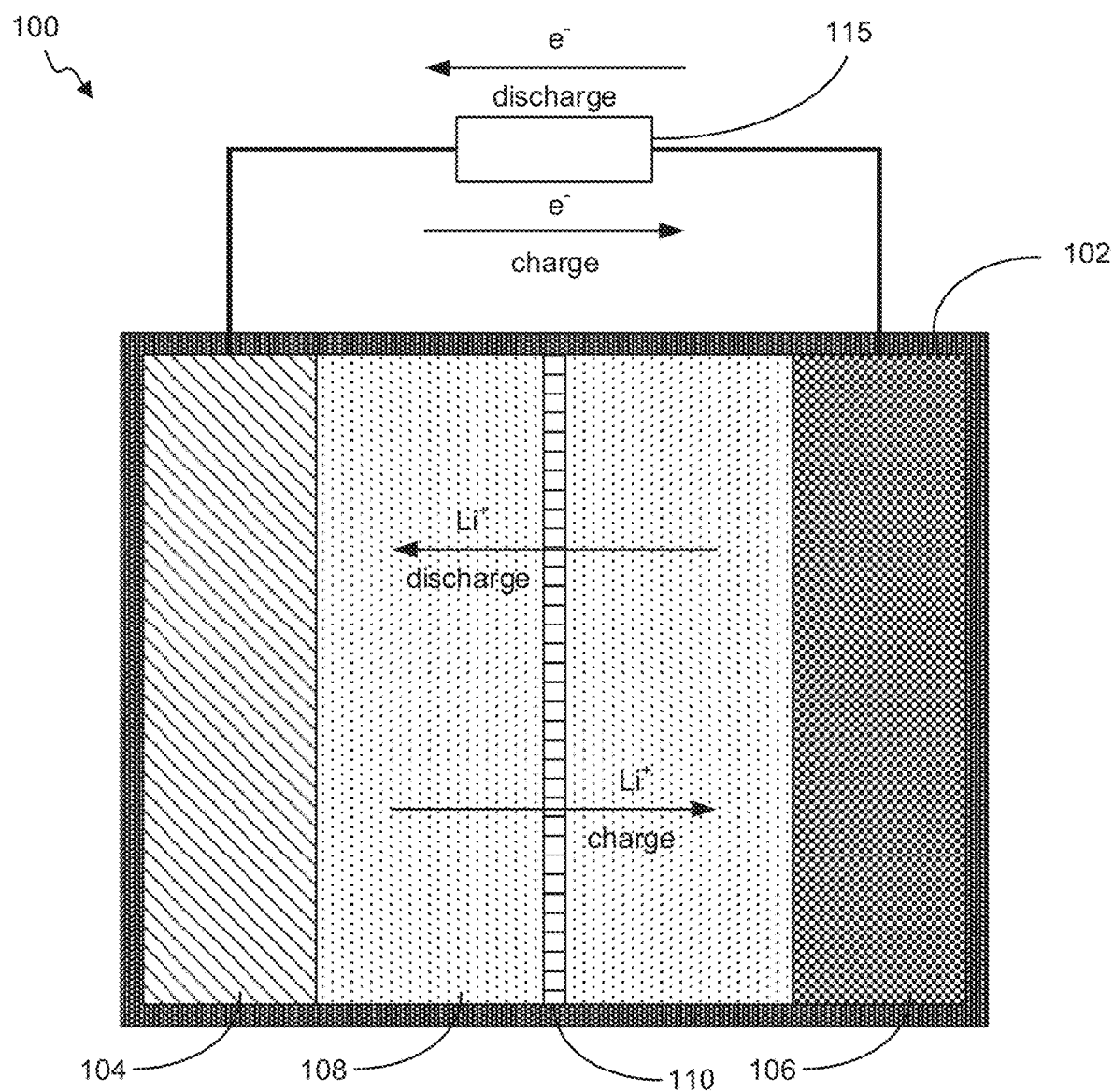
FIG. 1 is a simplified cutaway view of an example lithium ion battery cell.

For the purposes of this disclosure, the following terms have the following meanings:

Acidic oxide—a term used generally in the scientific literature to refer to binary compounds of oxygen with a nonmetallic element. An example is carbon dioxide, $CO_2$. The oxides of some metalloids (e.g., Si, Te, Po) also have weakly acidic properties in their pure molecular state.

Acidified metal oxide ("AMO")—a term used here to denote a binary compound of oxygen with a metallic element which has been synthesized or modified to have an acidity greater than that of its natural mineralogical state and also a Hammet function, $H_0>12$ (not superacidic). The average particle size is also less than that of the natural mineralogical state. Naturally occurring mineralogical forms do not fall within the scope of the inventive AMO material. A synthesized metal oxide, however, that is more acidic than its most abundant naturally occurring mineralogical form (of equivalent stoichiometry) but not superacidic falls within the bounds of this disclosure and can be said to be an AMO material provided it satisfies certain other conditions discussed in this disclosure.

Acidic—a term used generally in the scientific literature to refer to compounds having a pH of less than 7 in aqueous solution.

Electron-withdrawing group ("EWG")—an atom or molecular group that draws electron density towards itself. The strength of the EWG is based upon its known behavior in chemical reactions. Halogens, for example are known to be strong EWGs. Organic acid groups such as acetate are known to be weakly electron withdrawing.

Hammet function—An additional means of quantifying acidity in highly concentrated acid solutions and in superacids, the acidity being defined by the following equation: $H_0 = pK_{BH+} + \log([B]/[BH+])$. On this scale, pure 18.4 molar $H_2SO_4$ has a $H_0$ value of −12. The value $H_0=-12$ for pure sulfuric acid must not be interpreted as pH=−12, instead it means that the acid species present has a protonating ability equivalent to $H_3O^+$ at a fictitious (ideal) concentration of $10^{12}$ mol/L, as measured by its ability to protonate weak bases. The Hammet acidity function avoids water in its equation. It is used herein to provide a quantitative means of distinguishing the AMO material from superacids. The Hammet function can be correlated with colorimetric indicator tests and temperature programmed desorption results.

Layered construction—As used herein, the term "layered construction" shall mean a battery cell comprised of discrete deposits of material (which may or may not be the same material) with at least one interface therebetween. The interface may be present during construction, but effectively diminished or eliminated in the final product as specified herein.

Low loading—an active material or mixed layer including an active material wherein the active material is present in amounts in a range of 10% wgt. to 80% wgt.

Metal oxide—a term used generally in the scientific literature to refer to binary compounds of oxygen with a metallic element. Depending on their position in the periodic table, metal oxides range from weakly basic to amphoteric (showing both acidic and basic properties) in their pure molecular state. Weakly basic metal oxides are the oxides of lithium, sodium, magnesium, potassium, calcium, rubidium, strontium, indium, cesium, barium and tellurium. Amphoteric oxides are those of beryllium, aluminum, gallium, germanium, astatine, tin, antimony, lead and bismuth.

Monodisperse—characterized by particles of uniform size which are substantially separated from one another, not agglomerated as grains of a larger particle.

pH—a functional numeric scale used generally in the scientific literature to specify the acidity or alkalinity of an aqueous solution. It is the negative of the logarithm of the concentration of the hydronium ion $[H_3O^+]$. As used here it describes the relative acidity of nanoparticles suspended in aqueous solution.

Surface functionalization—attachment of small atoms or molecular groups to the surface of a material.

Superacid—substances that are more acidic than 100% $H_2SO_4$, having a Hammet function, $H_o < -12$.

DETAILED DESCRIPTION OF THE PREFERRED EMBODIMENTS

Described herein are high capacity electrochemical cells and cell components, such as electrodes, for such cells. The disclosed electrochemical cells and electrodes comprise metal oxides, which may be AMO or non-AMO nanomaterials, and exhibit high capacity. In embodiments, the metal oxides are provided at a relatively low loading (weight percent) in the electrodes, such as at weight percents less than 30%, with the majority of the remainder of the electrodes comprising conductive materials and binders. Even with such low loadings, capacities of greater than 10,000 mAh/g in the case of AMO nanomaterial has been observed. The electrodes may be provided in layered or non-layered configurations. Example layered configurations include separate layers including AMO nanomaterial and low loading or non-AMO containing layers. In other embodiments non-AMO metal oxides may be layered with other non-AMO metal oxides of the same of different material. In further embodiment, layers may include both AMO and non-AMO metal oxides in the same layered structure. The layering of electrodes is optional, however, and high capacities are observed in both layered and non-layered electrodes.

Referring now to FIG. 1, a lithium ion battery cell 100 is illustrated in a simplified cutaway view. The cell 100 may comprise a casing or container 102. In some embodiments, the casing 102 is a polymer or an alloy. The casing 102 chemically and electrically isolates the contents of the cell 100 from adjacent cells, from contamination, and from damaging or being damaged by other components of the device into which the cell 100 is installed. A full battery may contain a plurality of cells arranged in a series and/or parallel configuration. The battery may have a further casing or securement mechanism binding the plurality of cells together as is known in the art.

The cell 100 provides a cathode 104 and an anode 106. The contents of the cell 100 undergo a chemical reaction when a conduction path is provided between the cathode 104 and anode 106 that is external to the cell 100. As a result of the chemical reaction, electrons are provided at the anode 106 that flow to the cathode 104 via the circuit provided external to the battery (sometimes referred to as the load). At a basic level, during discharge of the cell 100, the materials comprising the anode 106 are oxidized providing the electrons that flow through the circuit. The materials comprising the cathode 104, as recipient of the electrons given up by the anode 106, are reduced.

Within the cell 100, during discharge, metallic cations move through an electrolyte 108 from the anode 106 to the cathode 104. In the case of a lithium based battery, the metallic cation may be a lithium cation (Li+). The electrolyte 108 may be a liquid electrolyte such as a lithium salt in an organic solvent (e.g., $LiClO_4$ in ethylene carbonate). Other lithium based electrolyte/solvent combinations may be used as are known in the art. In some cases the electrolyte 108 may be a solid electrolyte such as a lithium salt in a polyethylene oxide. Optionally, the electrolyte may comprise a polymer electrolyte. Example electrolytes include those described in U.S. Patent Application Publication 2017/0069931, which is hereby incorporated by reference.

A separator 110 may be employed to prevent contact between the electrodes 104, 106. The separator 110 may be a porous layer of material that is permeable to the lithium ions and the electrolyte 108 but not otherwise electrically conductive so as to prevent internal shorting of the cell 100. As is known in the art, the separator 110 may comprise glass fibers or may comprise a polymer, possibly with a semi-crystalline structure. Additional components, such as current collectors, may also be included in the cell 100, but are not shown in FIG. 1.

Together the anode 104, cathode 106, electrolyte 108, and separator 110 form the completed cell 100. Since the separator 110 is porous, the electrolyte 108 may flow into, or be contained by, the separator 110. Under normal operating conditions, the porosity of the separator 110 allows for ion (Li+) flow between the electrodes 104, 106 via the electrolyte 108. As is known in the art, a separator can be constructed so as to melt and close the internal pore structure to shut down the cell in the event of exposure to excess heat or a runaway exothermic reaction.

Most lithium-based cells are so-called secondary batteries. They can be discharged and recharged many times before the chemical or structural integrity of the cell falls below acceptable limits. Cells and batteries according to the present disclosure are considered to be both primary (e.g., single use) and secondary batteries.

In the case of the cell 100 being a secondary cell (or part of a secondary battery) it should be understood that the cell 100 may be recharged either alone or as a component of a completed system wherein multiple cells are recharged simultaneously (and possibly in the same parallel or series circuit).

A reverse voltage is applied to the cell 100 in order to effect charging. It should be understood that various schemes for effective recharging of lithium batteries can be employed. Constant current, variable current, constant voltage, variable voltage, partial duty cycles, etc., may be employed. The present disclosure is not intended to be limited to a particular charging methodology unless stated in the claims. During charging of cell 100, element 115 represents a voltage source that is applied between cathode 104 and anode 106 to provide electrons from cathode 105 to anode 106 and allow chemical reactions to take place. Lithium ions are shuttled from cathode 104 to the anode 106 through electrolyte 108 and separator 110.

As examples, cathode 104 or anode 106 may independently comprise a metal oxide according to the present disclosure. The metal oxide may be a nano-material, possibly substantially monodispersed, and in either AMO or non-AMO form. For use of an AMO material as a cathode, an anode may correspond to lithium metal or a lithium intercalation material, such as graphite. Non-AMO cathodes may also be paired with an anode that may correspond to lithium metal or a lithium intercalation material. Optionally, electrolyte 108 may include an acidic species, such as dissolved in an organic solvent with a lithium salt. In addition to or alternative to use of an acidic species in electrolyte 108, an electrode (i.e., cathode 104 or anode 106) may optionally comprise an AMO and an acidic species. Oxalic acid is an exemplary acidic species.

Without wishing to be bound by any theory, it is believed that the presence of acidic species in the cathode 104 or anode 106 and/or electrolyte 108 improves a surface affinity of AMO materials toward lithium ions, resulting in an improved ability to take up lithium ions during discharge and overall improvement to capacity as compared to a similar cell lacking acidic species or having a basified electrode or electrolyte (i.e., including basic species). Alternatively or additionally, the presence of acidic species may allow for additional active sites for lithium uptake in cathode 104.

Figure 2:
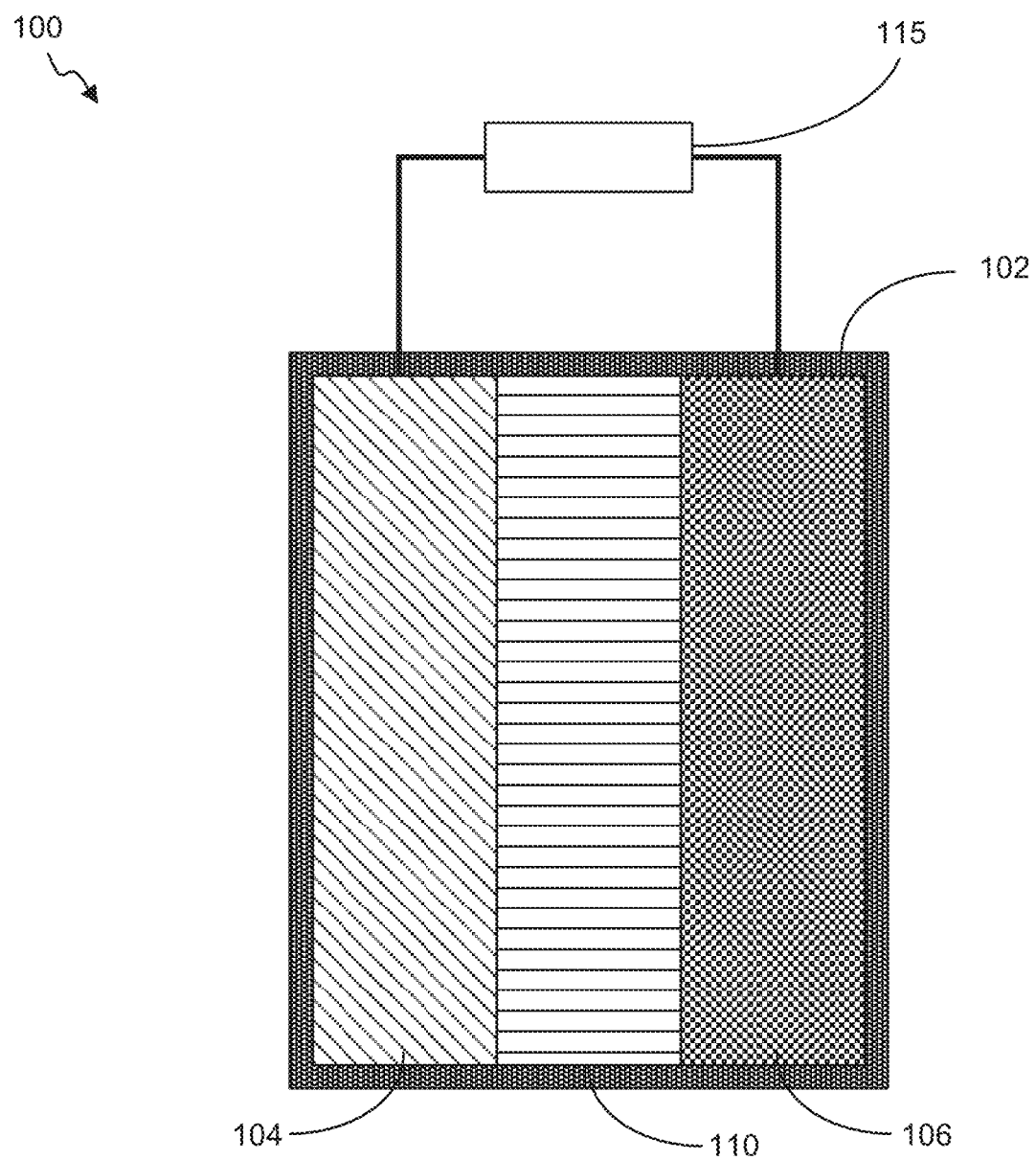
FIG. 2 is another simplified cutaway view of a lithium ion battery cell with the electrolyte substantially contained by the separator.

It should be understood that FIG. 1 is not to scale. A shown in FIG. 2, in most applications, the separator 110 occupies most or all of the space between the electrodes 104, 106 and is in contact with the electrodes 104, 106. In such case, the electrolyte 108 is contained within the separator 110 (but may also intrude into the pores or surface of the anode or cathode). FIG. 2 is also not necessarily to scale. The actual geometry of a cell can range from relatively thin and flat pouches, to canister type constructions, to button cells and others. Cell construction techniques such as winding or bobbin or pin type assemblies may be used.

Current collectors known in the art and other components (not shown) may also be relied upon to form a cell 100 into a commercially viable package. Although overall shape or geometry may vary, a cell or battery will normally, at some location or cross section, contain the electrodes 104, 106 separated rather than touching, and have the electrolyte 108 and possibly separator 110 between them. Cells may also be constructed such that there are multiple layers of anodes and cathodes. Cells may be constructed such that two cathodes are on opposite sides of a single anode or vice versa.

A functional or operational battery intended for a specific purpose may comprise a plurality of cells arranged according to the needs of particular application. An example of such a battery is shown schematically in FIG. 3. Here the battery 300 comprises four lithium cells 100 arranged in series to increase voltage. Capacity can be increased at this voltage by providing additional stacks of four cells 100 in parallel with the stack shown. Different voltages can be achieved by altering the number of cells 100 arranged in series.

Figure 3:
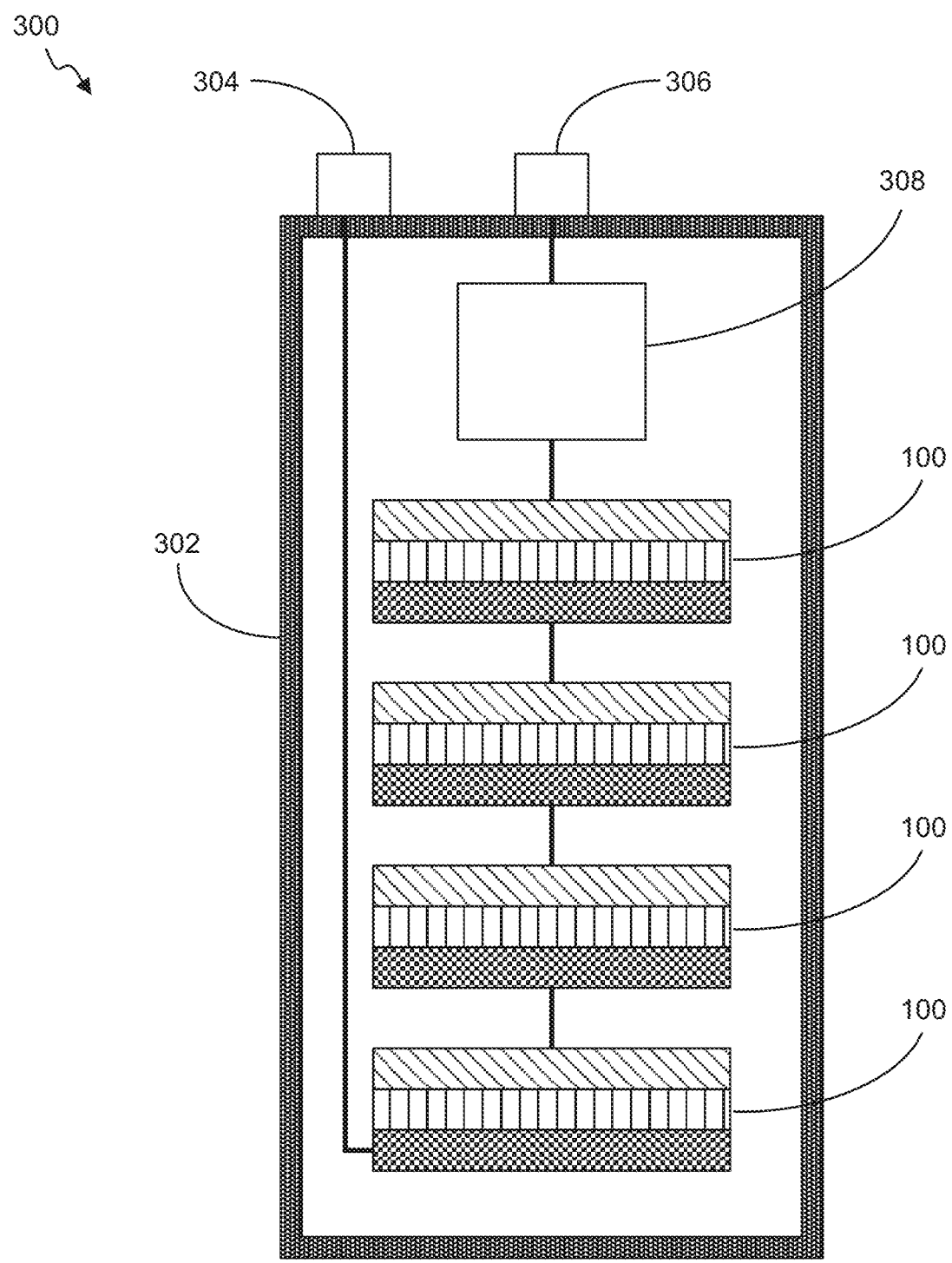
FIG. 3 is a schematic of a lithium ion battery comprising multiple cells.

A positive electrode 306 may be accessible on the outside of a casing 302 of the battery 300. A negative electrode 304 is also provided. The physical form factor of the electrodes 304, 306 may vary according to application. Various binders, glues, tapes and/or other securement mechanisms (not shown) may be employed within a battery casing 302 to stabilize the other components. Batteries based on lithium technology are generally operable, rechargeable, and storable in any orientation (if a secondary cell). As discussed above, cells 100 may take on various different geometric shapes. Thus FIG. 3 is not meant to represent any particular physical form factor of the battery 300.

The battery 300 may also comprise various adjunct circuitry 308 interposing the positive electrode 308 and the lithium cells 100 within the casing 302 of the battery 300. In other embodiments, the adjunct circuitry interposes the negative electrode 304 and the lithium cells 100 instead of, or in addition to, interposing the positive electrode 306 and the lithium cells 100. The adjunct circuitry 308 may include short circuit protection, overcharge protection, overheating shutdown and other circuitry as is known in the art to protect the battery 300, the cells 100, and/or any load attached to the battery 300.

The composition of materials chosen for the cathode 104, anode 106, and electrolyte may be critical to the performance of the cell 100 and any battery of which it forms a part. In the context of the present disclosure, various examples of AMOs and methods for their production are provided in this regard. These AMOs are suitable for use in forming anodes or cathodes in half cells, cells, and batteries. The AMOs of the present disclosure are otherwise compatible with known lithium cell technology including existing anode and cathode compositions, electrolyte formulations, and separator compositions. In other embodiments, the same or different production, construction, or formation methods may be employed as are utilized in the case of AMOs, but with non-AMO materials.

It will be appreciated that the material of the anode 106 chosen for a cell or battery according to the present disclosure may be less electronegative than the material of the cathode 104 to suitably complement the cathodic materials. In one particular embodiment, the disclosed AMOs are useful as a cathode in a cell having a metallic lithium anode.

In various embodiments of the present disclosure, the cathode 104 comprises an AMO material having a surface that is acidic but not superacidic. This would be in contrast to materials previously known and utilized as cathodes such as lithium cobalt or lithium manganese materials. The AMO materials of the present disclosure and methods for their production are described below. In other embodiments, the anode 106 comprises an AMO material of the present disclosure having a surface that is acidic but not super acidic.

The surfaces of metal oxides are ideally arrays of metal and oxygen centers, ordered according to the crystalline structure of the oxide. In reality the arrays are imperfect, being prone to vacancies, distortion, and the effects of surface attachments. Regardless, any exposed metal centers are cationic (positively charged) and can accept electrons, thus functioning by definition as Lewis acid sites. Oxygen centers are anionic (negatively charged) and act as Lewis base sites to donate electrons. This leads to the well-known amphotericity of metal oxide surfaces.

Under normal atmospheric conditions, the presence of water vapor will adsorb to the metal oxide surface either molecularly (hydration) or dissociatively (hydroxylation). Both OH– and H+ species can adsorb on the oxide surface. The negatively-charged hydroxyl species will attach at the metal, cationic (Lewis acid, electron accepting) centers, and the H+ will attach at the oxygen, anionic (Lewis base, electron donating) centers. Both adsorptions lead to the presence of the same functional group—a hydroxyl—on the metal oxide surface.

These surface hydroxyl groups can serve as either Brønsted acids or as Brønsted bases, because the groups can either give up or accept a proton. The tendency of an individual hydroxyl group to be a proton donor or a proton acceptor is affected by the coordination of the metal cation or oxygen anion to which it is attached. Imperfections of the metal oxide surface such as oxygen vacancies, or coordination of the surface groups with other chemical species, mean that all cations and anions are not equally coordinated. Acid-base sites will vary in number and in strengths. When broadly "totaled" across the surface of the oxide, this can give the surface an overall acidic or basic character.

The quantity and strength of Lewis acid and base sites (from the exposed metal cations and oxygen anions, respectively) and Brønsted acid and base sites (from the surface hydroxyl groups)—add broad utility and functionality to the metal oxide and its use in both chemical reactions and device applications. The sites are a strong contributor to the chemical reactivity of the metal oxide. They can serve as anchor sites to which other chemical groups, and even additional metal oxides, may be attached. And they can affect surface charge, hydrophilicity and biocompatibility.

One way of altering the surface of metal oxides is to attach small chemical groups or electron-withdrawing groups ("EWGs") in a process known as surface functionalization. The EWG induces polarization of the hydroxide bonds and facilitates dissociation of hydrogen. For example, a stronger EWG should lead to a more polarized bond and therefore a more acidic proton. The acidity of Lewis sites can be increased by inducing polarization that facilitates the donation of electrons to the site. When compounds so made are placed in water, the acidic protons will dissociate and so reduce the aqueous pH measurement.

Though somewhat imprecise when working with solid acid/base systems rather than liquid ones, traditional methods of pH measurement utilizing titrations, pH paper and pH probes can be used to evaluate the acidity of metal oxides dispersed in aqueous solution. These measurements can be supplemented by the use of techniques including but not limited to colorimetric indicators, infrared spectroscopy, and temperature programmed desorption data to establish the acidified nature of the metal oxide surface. Surface groups can be examined by standard analytical techniques including but not limited to x-ray photoelectron spectroscopy.

Surface functionalization can be accomplished post-synthesis, including but not limited to exposing the metal oxide to acidic solutions or to vapors containing the desired functional groups. It can also be accomplished via solid state methods, in which the metal oxide is mixed and/or milled with solids containing the desired functional groups. However, all of these methods require an additional surface functionalization step or steps beyond those required to synthesize the metal oxide itself.

Synthesis and surface functionalization of the AMO material may be accomplished in a "single-pot" hydrothermal synthesis method or its equivalent in which the surface of the metal oxide is functionalized as the metal oxide is being synthesized from appropriate precursors. A precursor salt containing an EWG is solubilized and the resulting solution is acidified using an acid containing a second EWG. This acidified solution is then basified and the basified solution is heated then washed. A drying step produces the solid AMO material.

By way of example, a preferred embodiment of an AMO form of tin oxide was synthesized and simultaneously surface functionalized using the following single-pot method:

1. Initially, seven grams (7 g) of a tin (II) chloride dihydrate ($SnCl_2 \cdot 2H_2O$) is dissolved in a solution of 35 mL of absolute ethanol and 77 mL distilled water.
2. The resulting solution is stirred for 30 minutes.
3. The solution is acidified by the addition of 7 mL of 1.2M HCl, added dropwise, and the resulting solution is stirred for 15 minutes.
4. The solution is basified by the addition of 1M of an aqueous base, added dropwise until the pH of the solution is about 8.5.
5. The resulting opaque white suspension is then placed in a hot-water bath (~60° to 90° C.) for at least 2 hours while under stirring.
6. The suspension is then washed with distilled water and with absolute ethanol.
7. The washed suspension is dried at 100° C. for 1 hour in air and then annealed at 200° C. for 4 hours in air.

This method results in an AMO of tin, surface-functionalized with chlorine, whose pH is approximately 2 when resuspended and measured in an aqueous solution at 5 wt % and room temperature. By definition its Hammet function, $H_0 > -12$. Although an open system such as a flask is described here, a closed system such as an autoclave may also be used.

Utilizing the single pot method disclosed above, a number of AMO's have been synthesized. Table 1 below describes the precursors and acids that have been used. In some instances, a dopant is utilized as well:

| Precursor | Dopant | Acid |
|---|---|---|
| SnAc | | $CH_3COOH$ |
| SnAc | | $H_2SO_4$ |
| SnAc | | $HNO_3$ |
| SnAc | | $H_3PO_4$ |
| SnAc | | $C_6H_8O_7$ |
| SnAc | | $C_2H_2O_4$ |
| SnAc | FeAc | HCl |
| SnAc | FeAc | $H_2SO_4$ |
| SnAc | FeAc | $HNO_3$ |
| SnAc | FeAc | $C_2H_2O_4$ |
| SnAc | FeAc | $H_3PO_4$ |
| SnAc | FeAc | $C_6H_8O_7$ |
| SnAc | HBr | |
| SnAc | $H_3BO_3$ | |
| $SnSO_4$ | $MnCl_2$ | $H_2SO_4$ |
| $SnCl_2$ | $MnCl_2$ | HCl |
| $SnCl_2$ | $FeCl_3$ & $AlCl_3$ | HCl |
| $FeCl_3$ | $SnCl_2$ | HCl |
| $Fe(NO_3)_3$ | | $HNO_3$ |
| $BiCl_3$ | | HCl |
| $Zr(SO_4)_2$ | | $H_2SO_4$ |
| $TiOSO_4$ | | $H_2SO_4$ |
| $Sb_2(SO_4)_3$ | | $H_2SO_4$ |
| $In(Cl)_3$ | | HCl |
| $In_2(SO_4)_3$ | | $H_2SO_4$ |
| In(III)Br | | HBr |
| $InCl_3$ | | HCl |
| LiAc & $FeCl_3$ | $SnCl_2$ | HCl | where Ac is an acetate group with the chemical formula $C_2H_3O_2$

In some embodiments, the electron withdrawing groups have a carbon chain length of 6 or less and/or an organic mass of 200 or less (AMU). In some embodiments, the electron withdrawing groups have a carbon chain length or 8 or less, or 10 or less, and/or an organic mass of 500 or less.

It will be appreciated that the method's parameters can be varied. These parameters include, but are not limited to, type and concentration of reagents, type and concentration of acid and base, reaction time, temperature and pressure, stir rate and time, number and types of washing steps, time and temperature of drying and calcination, and gas exposure during drying and calcination. Variations may be conducted singly, or in any combination, possibly using experimental design methodologies. Additionally, other metal oxide synthesis methods—e.g., spray pyrolysis methods, vapor phase growth methods, electrodeposition methods, solid state methods, and hydro- or solvo thermal process methods—may be useful for achieving the same or similar results as the method disclosed here.

A variety of annealing conditions are useful for preparing AMO nanomaterial. Example annealing temperatures may be below 300° C., such as from 100° C. to 300° C. Example annealing time may range from about 1 hours to about 8 hours, or more. Annealing may take place under a variety of atmospheric conditions. For example, annealing may occur in air at atmospheric pressure. Annealing may occur at elevated pressure (greater than atmospheric pressure) or reduced pressure (less than atmospheric pressure or in a vacuum). Annealing may alternatively occur in a controlled atmosphere, such as under an inert gas (e.g., nitrogen, helium, or argon) or in the presence of an oxidizing gas (e.g., oxygen or water).

A variety of drying conditions are useful for preparing AMO nanomaterials. Example drying temperatures may be from 50° C. to 150° C. Example drying time may range from about 0.5 hours to about 8 hours, or more. Drying may take place under a variety of atmospheric conditions. For example, drying may occur in air at atmospheric pressure. Drying may occur at elevated pressure (greater than atmospheric pressure) or reduced pressure (less than atmospheric pressure or in a vacuum). Drying may alternatively occur in a controlled atmosphere, such as under an inert gas (e.g., nitrogen, helium, or argon) or in the presence of an oxidizing gas (e.g., oxygen or water).

Figure 4:
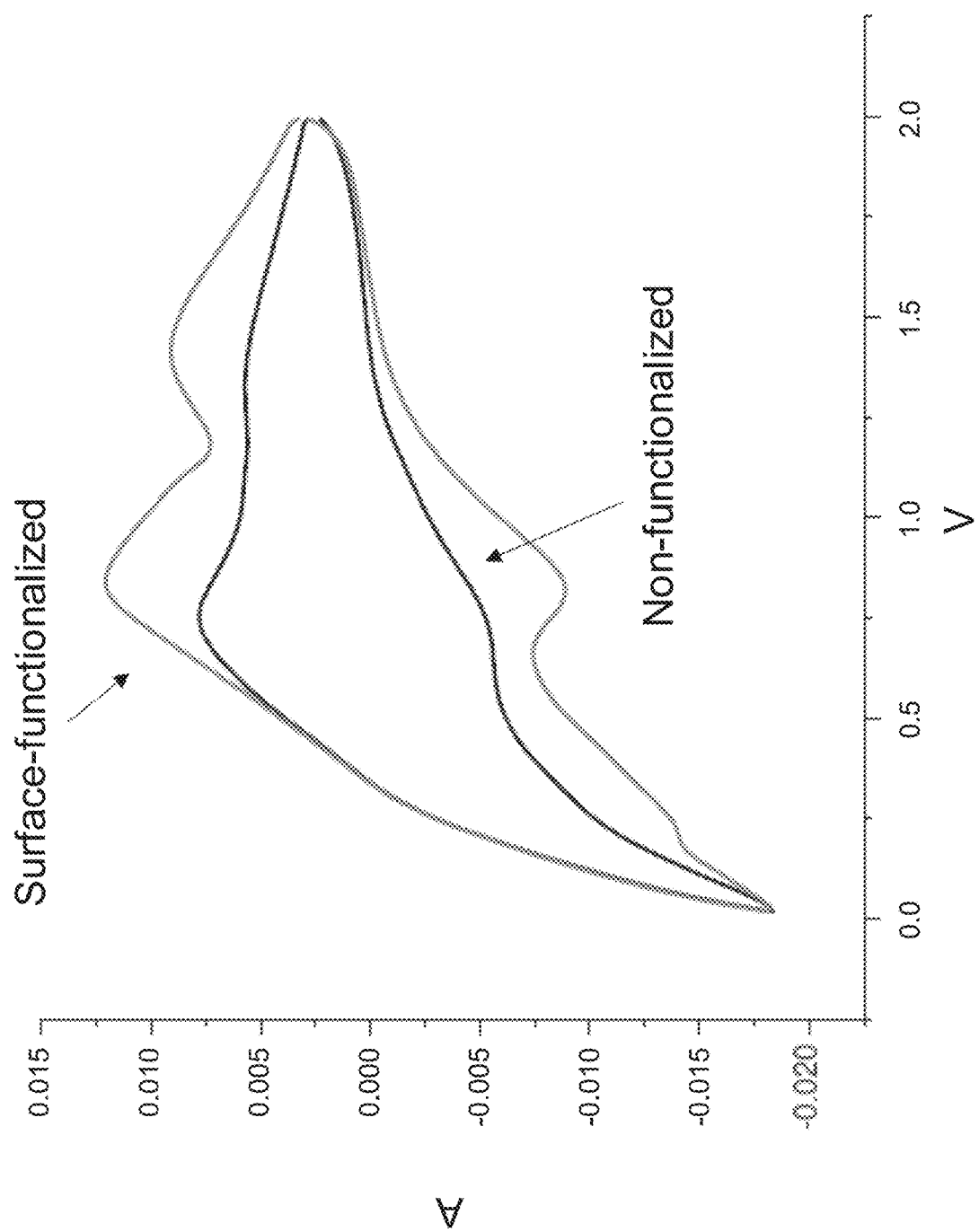
FIG. 4 shows differences in the cyclic voltammogram of AMO tin prepared by the method disclosed herein relative to that of commercially available, non-AMO tin when cycled against Li.

The performance characteristics of the AMO nanomaterials of the present disclosure differ from those of non-acidified metal oxide nanoparticles. As one example, FIG. 4 shows differences in the cyclic voltammogram of AMO tin prepared by the single-pot method relative to that of commercially available, non-AMO tin when cycled against lithium. For example, the surface-functionalized AMO material exhibits better reversibility than the non-AMO material. The presence of distinct peaks in the CV of the AMO material may indicate that multiple electron transfer steps are occurring during charging/discharging. For example, a peak at higher voltage may indicate direct oxidation/reduction of the AMO material, while a peak at lower voltage may originate due to changing the material structure of the AMO material (i.e., alloying).

Figure 5:
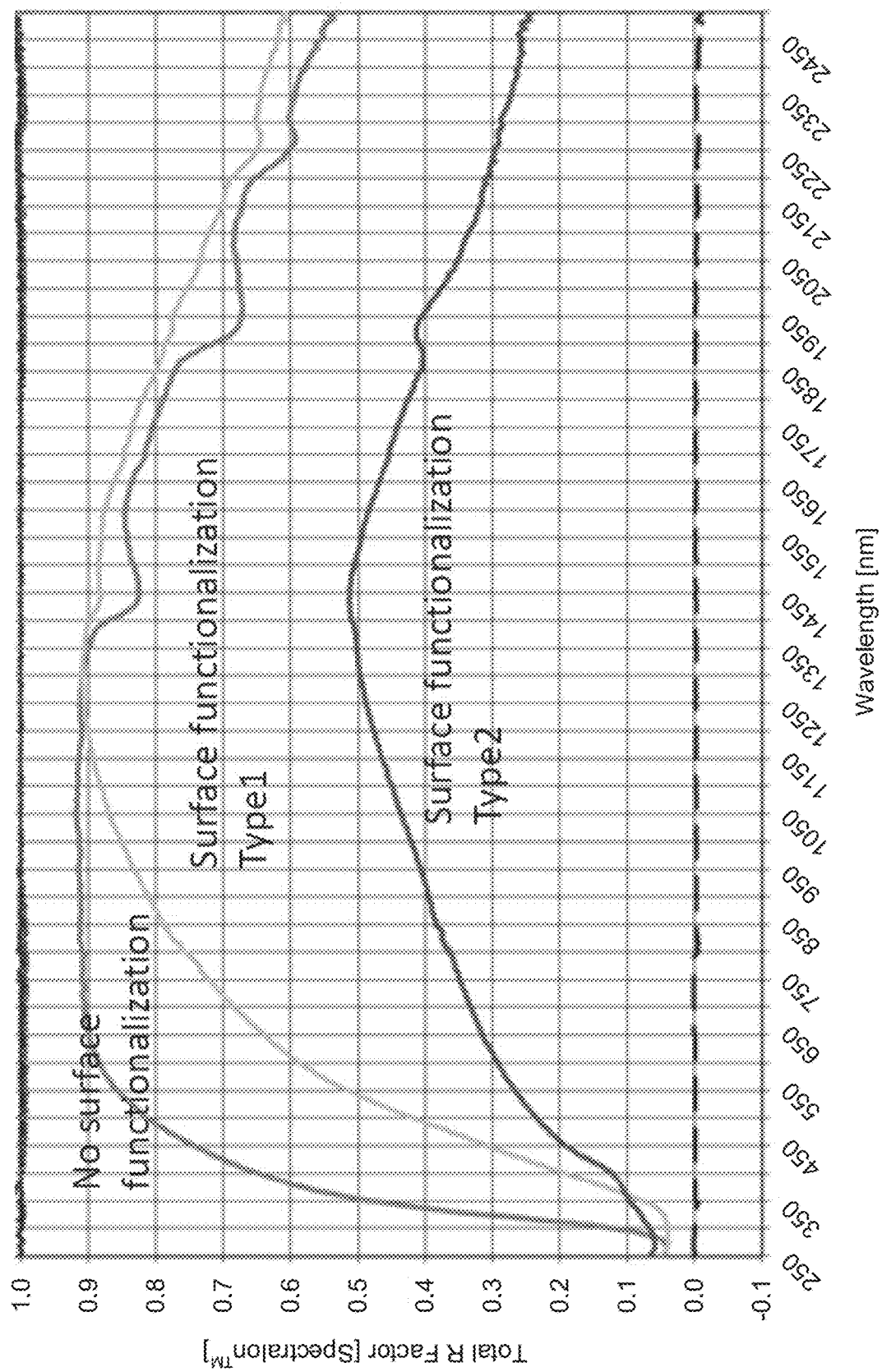
FIG. 5 shows the total reflectance of AMO tin oxide is different than that of commercially available, non-AMO tin oxide.

As another example, FIG. 5 shows the total reflectance of AMO tin oxide is different than that of commercially available, non-AMO tin oxide. The data indicates that the AMO has a lower band gap and therefore more desirable properties as a component of a photovoltaic system in addition to use as an anode according to the present disclosure.

The AMO material may be thought of as having the general formula

where
$M_mO_x$ is the metal oxide, m being at least 1 and no greater than 5, x being at least 1 and no greater than 21;
G is at least one EWG that is not hydroxide, and
/ simply makes a distinction between the metal oxide and the EWG, denoting no fixed mathematical relationship or ratio between the two.

G may represent a single type of EWG, or more than one type of EWG.

Exemplary AMOs are acidified tin oxides ($Sn_xO_y$), acidified titanium dioxides ($Ti_aO_b$), acidified iron oxides ($Fe_cO_d$), and acidified zirconium oxide ($Zr_eO_f$). Exemplary electron-withdrawing groups ("EWGs") are Cl, Br, $BO_3$, $SO_4$, $PO_4$ and $CH_3COO$. Regardless of the specific metal or EWG, according to the present disclosure, the AMO material is acidic but not superacidic, yielding a pH<7 when suspended in an aqueous solution at 5 wt % and a Hammet function, $H_0$>−12, at least on its surface.

The AMO material structure may be crystalline or amorphous (or a combination thereof), and may be utilized singly or as composites in combination with one another, with non-acidified metal oxides, or with other additives, binders, or conductive aids known in the art. In other words, an anode prepared to take advantage of the AMO's of the present disclosure may or may not comprise other materials. In one embodiment, the AMO may be layered upon a conductive material to form the cathode 104. In some embodiments, the AMO material is added to a conductive aid material such as graphite or conductive carbon (or their equivalents) in a range of 10 wt % to 80 wt % and upwards of 90 wt % to 95 wt %. In preferred embodiments, the AMO is added at 10 wt %, 33 wt %, 50 wt %, and 80 wt %.

To maximize the amount of overall surface area available, the AMO should be in nanoparticulate form (i.e., less than 1 micron in size) and substantially monodispersed. More preferably, the nanoparticulate size is less than 100 nm and, even more preferably, less than 20 nm or 10 nm. In other embodiments utilizing non-AMO metal oxides, the material may nevertheless be in nanoparticulate form and may be substantially monodispersed. Again, the nanoparticles size may be less than 100 nm and preferably less than 20 nm or less than 10 nm.

Mixed-metal AMOs, in which another metal or metal oxide is present in addition to the simple, or binary oxide, have been reduced to practice in forming anodes utilized in half cells, cells, and batteries. These mixed-metal AMOs may be thought of as having the general formula

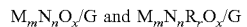

where:
M is a metal and m is at least 1 and no greater than 5;
N is a metal and n is greater than zero and no greater than 5;
R is a metal and r is greater than zero and no greater than 5;
O is total oxygen associated with all metals and x is at least 1 and no greater than 21;
/ simply makes a distinction between the metal oxide and the electron-withdrawing surface group, denoting no fixed mathematical relationship or ratio between the two; and
G is at least one EWG that is not hydroxide.

G may represent a single type of EWG, or more than one type of EWG.

Some prior art mixed metal oxide systems, of which zeolites are the most prominent example, display strong acidity even though each simple oxide does not. Preferred embodiments of the mixed-metal AMO of this disclosure differ from those systems in that any embodiment must include at least one AMO which is acidic (but not super-acidic) in simple $M_mO_x/G$ form. Preferred mixed metal and metal oxide systems are $Sn_xFe_cO_{y+d}$ and $Sn_xTi_aO_{y+b}$, where y+d and y+b may be an integer or non-integer value.

In another embodiment, the mixed metal AMO material is produced via the single-pot method with one modification: synthesis begins with two metal precursor salts rather than one, in any proportion. For example, Step 1 of the single-pot method may be altered as follows: Initially, 3.8 g of tin (II) chloride dihydrate ($SnCl_{22}H_2O$) and 0.2 g of lithium chloride (LiCl) are dissolved in a solution of 20 mL of absolute ethanol and 44 mL distilled water.

Metal precursor salts as shown in Table 1 could also be used, in any proportion. The metal precursor salts could have the same or differing anionic groups, depending on the desired product; could be introduced at different points in the synthesis; or could be introduced as solids or introduced in a solvent. In some embodiments, a first metal precursor salt may be used for the primary structure (i.e., larger proportion) of the resultant AMO, and a second (and optionally a third) metal precursor salt may be added as a dopant or as a minor component for the resultant AMO.

Experimentation with the single-pot method led to seven notable findings. First, in all cases both surface functionalization and acidity arise endogenously (see FIG. 6), rather than created post-synthesis. Unlike prior art surface functionalization methods, the single-pot method does not require any additional step or steps for surface functionalization beyond those required to synthesize the metal oxide itself, nor does it make use of hydroxyl-containing organic compounds or hydrogen peroxide.

Second, the method is broadly generalizable across a wide range of metal oxides and EWGs. Using the methods of the present disclosure, metal oxides of iron, tin, antimony, bismuth, titanium, zirconium, manganese, and indium have been synthesized and simultaneously surface-functionalized with chlorides, sulfates, acetates, nitrates, phosphates, citrates, oxalates, borates, and bromides. Mixed metal AMOs of tin and iron, tin and manganese, tin and manganese and iron, tin and titanium, indium and tin, antimony and tin, aluminum and tin, lithium and iron, and lithium and tin also have been synthesized. Additionally, surface functionalization can be accomplished using EWGs that are weaker than halogens and $SO_4$ yet still produce acidic but not superacidic surfaces. For example, the method also has been used to synthesize AMOs surface-functionalized with acetate ($CH_3COO$), oxalate ($C_2O_4$), and citrate ($C_6H_5O_7$). A variety of Examples are described below.

Figure 7:
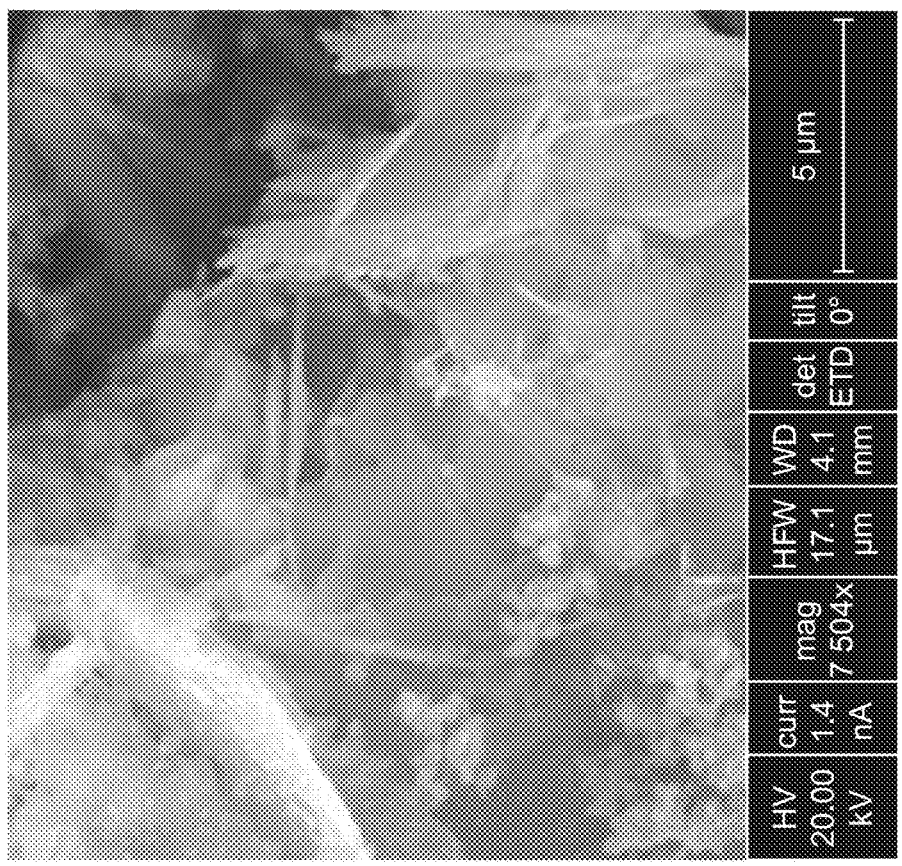
FIG. 7 provides electron micrograph images showing differences in morphology between AMO nanoparticles synthesized under identical conditions except for the use of a different group for functionalization.
Figure 7:
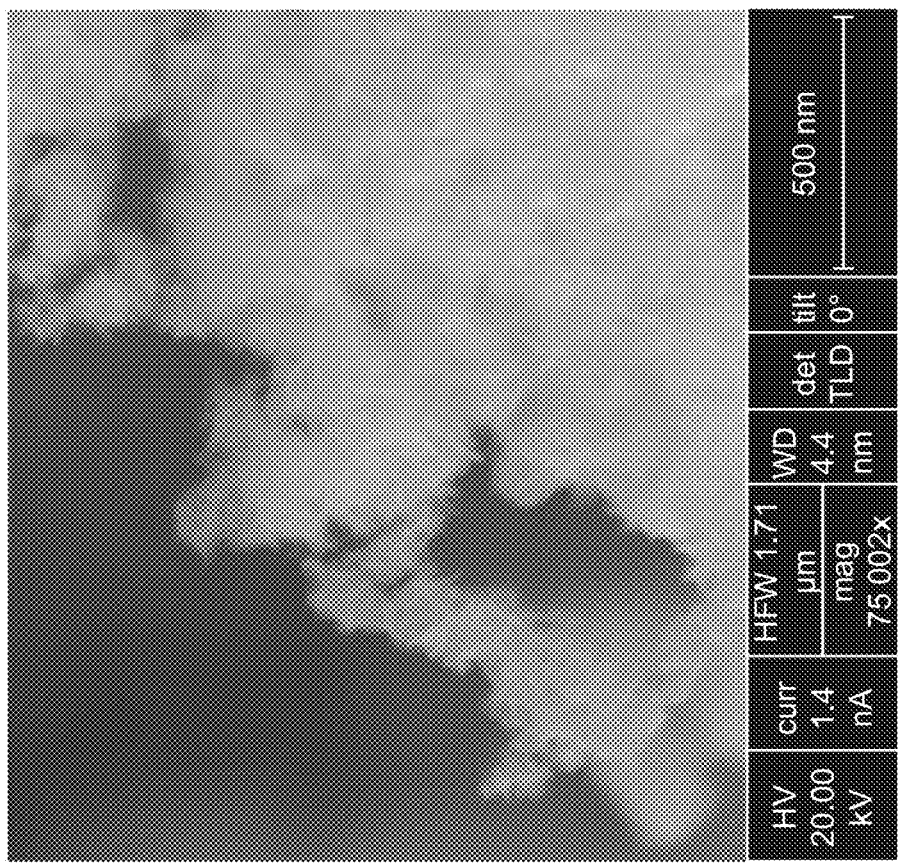

Third, there is a synergistic relationship between the EWG and other properties of the nanoparticles such as size, morphology (e.g., plate-like, spherical-like, needle- or rod-like), oxidation state, and crystallinity (amorphous, crystalline, or a mixture thereof). For example, differences in morphology can occur between AMO nanoparticles synthesized under identical conditions except for the use of a different EWG for surface functionalization (see FIG. 7). The surface functionalization may act to "pin" the dimensions of the nanoparticles, stopping their growth. This pinning may occur on only one dimension of the nanoparticle, or in more than one dimension, depending upon exact synthesis conditions.

Figure 8:
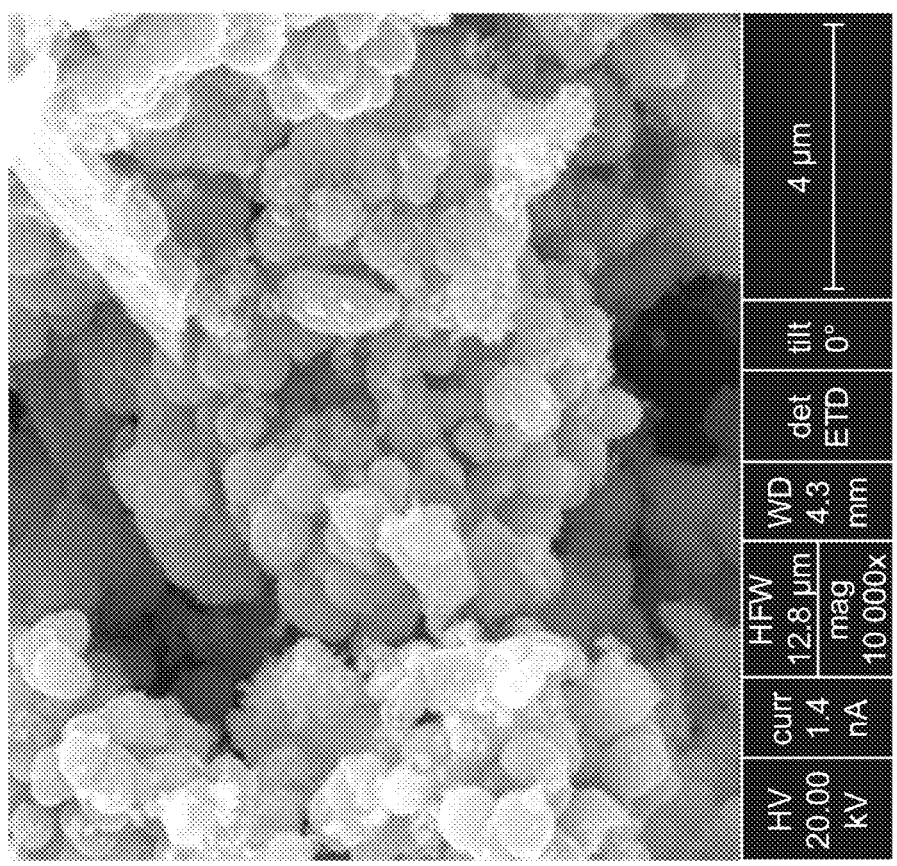
FIG. 8 shows the difference in morphology and performance of AMO nanoparticles synthesized under identical conditions except for having two different total reaction times.
Figure 8:
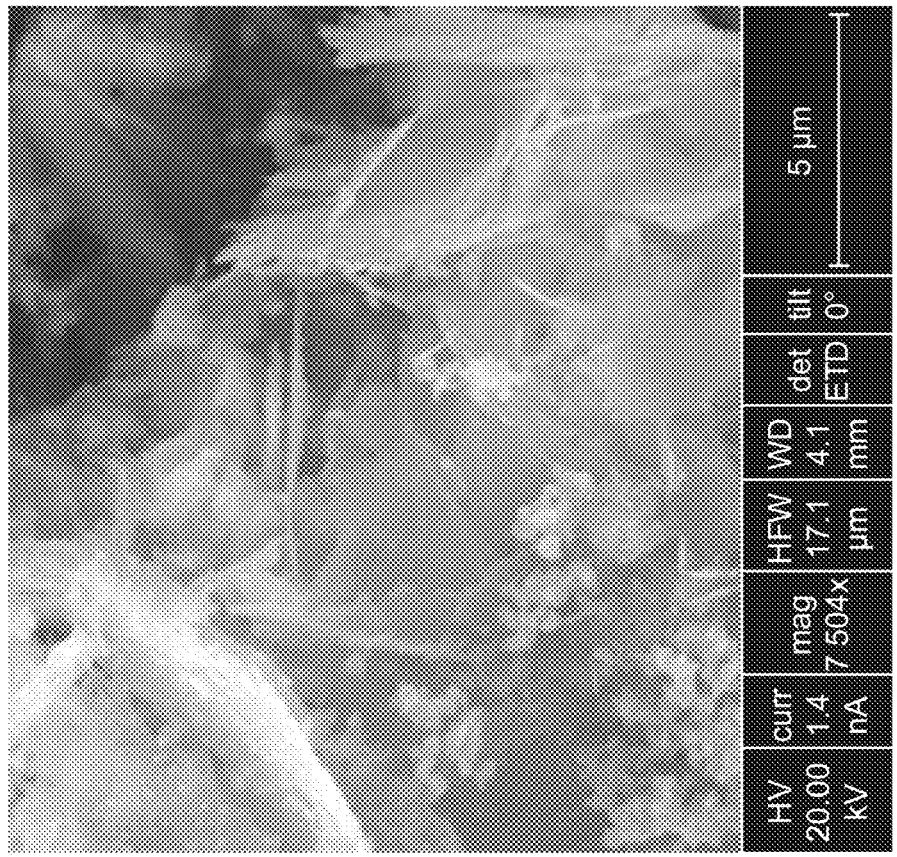
Figure 9:
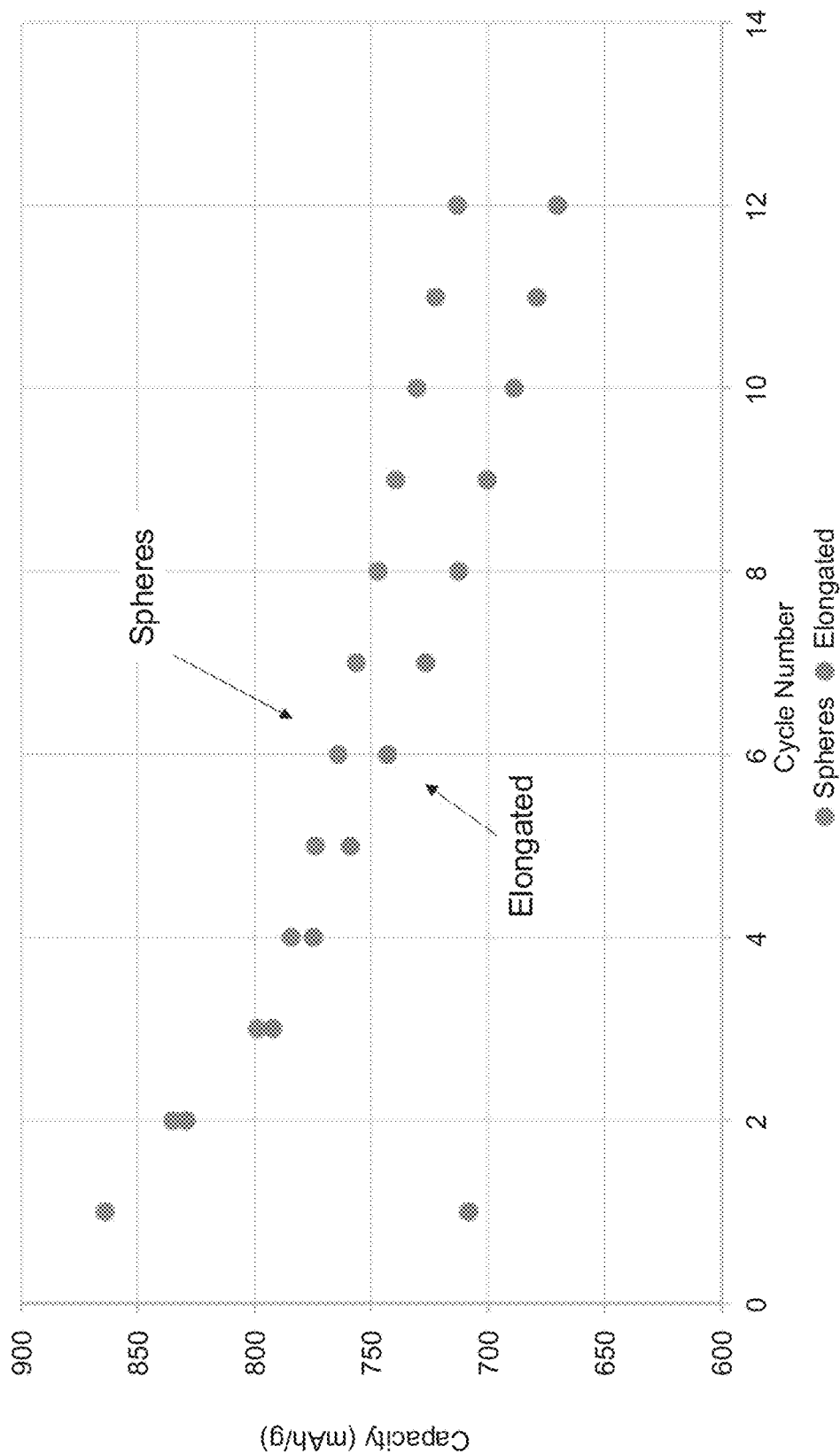
FIG. 9 provides representative half-cell data showing differences in behavior between spherical and elongated (needle-like or rod-like) AMOs upon cycling against lithium.

Fourth, the character of the AMO is very sensitive to synthesis conditions and procedures. For example, differences in morphology and performance of the AMD's nanoparticles can occur when synthesized under identical conditions except for having two different total reaction times (see FIGS. 8 and 9). Experimental design methodologies can be used to decide the best or optimal synthesis conditions and procedures to produce a desired characteristic or set of characteristics.

Fifth, both the anion present in the precursor salt and the anion present in the acid contribute to the surface functionalization of the AMO. In one preferred embodiment, tin chloride precursors and hydrochloric acid are used in a synthesis of an AMO of tin. The performance of these particles differ from an embodiment in which tin chloride precursors and sulfuric acid are used, or from an embodiment in which tin sulfate precursors and hydrochloric acid are used. Therefore, matching the precursor anion and acid anion is preferred in some embodiments.

Sixth, when utilizing a precursor with a weak EWG and an acid with a strong EWG, or vice versa, the strongly withdrawing anion will dominate the surface functionalization. This opens up a broader range of synthesis possibilities, allowing functionalization with ions that are not readily available in both precursor salts and acids. It may also permit mixed functionalization with both strong and weak EWGs. In one example, a tin acetate precursor and phosphoric acid are used to synthesize an AMO of tin. X-ray photoelectron spectroscopy analysis of the surface shows a greater atomic concentration of phosphorous than of the bonds associated with acetate groups (see FIG. 10).

Figure 11A:
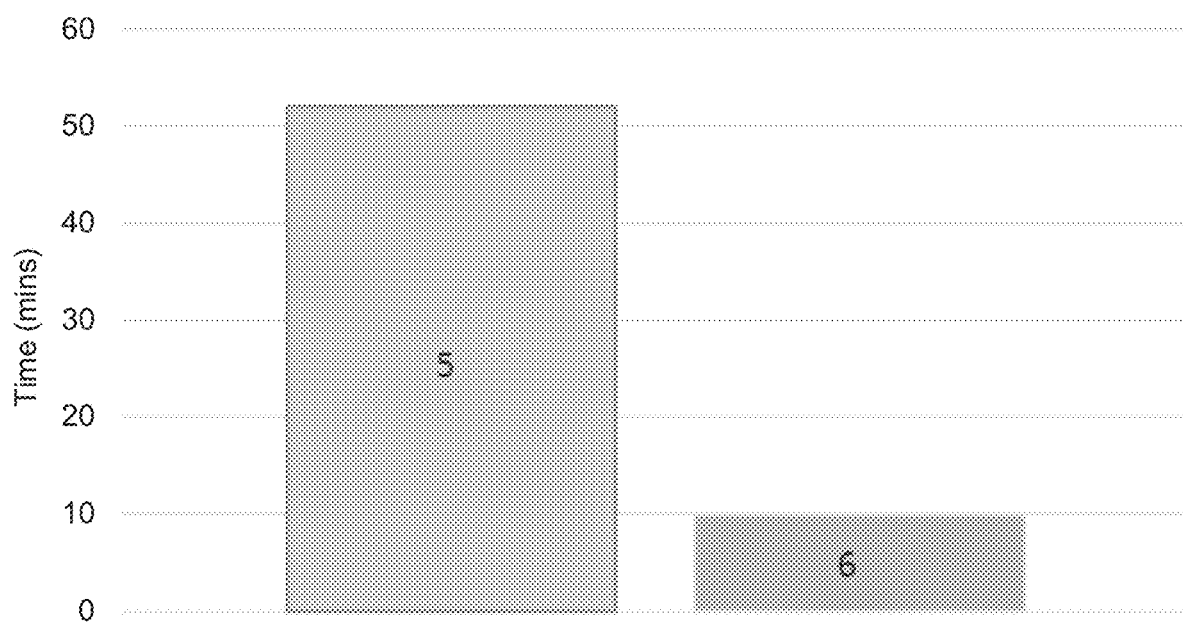
FIG. 11A provides data showing visible light activity degradation data for different AMOs.
Figure 11B:
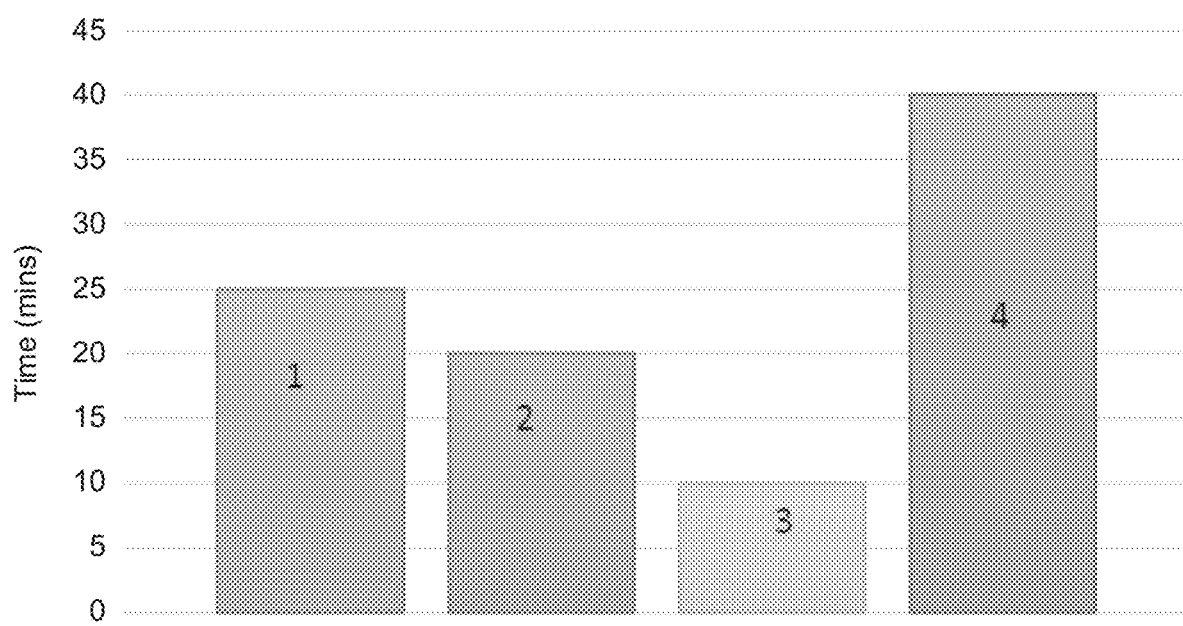
FIG. 11B provides data showing ultraviolet light activity degradation data for different AMOs.

Seventh, and last, while the disclosed method is a general procedure for synthesis of AMOs, the synthesis procedures and conditions may be adjusted to yield sizes, morphologies, oxidation states, and crystalline states as are deemed to be desirable for different applications. As one example, catalytic applications might desire an AMO material which is more active in visible light (see FIG. 11A) or one which is more active in ultraviolet light (see FIG. 11B).

Figure 12:
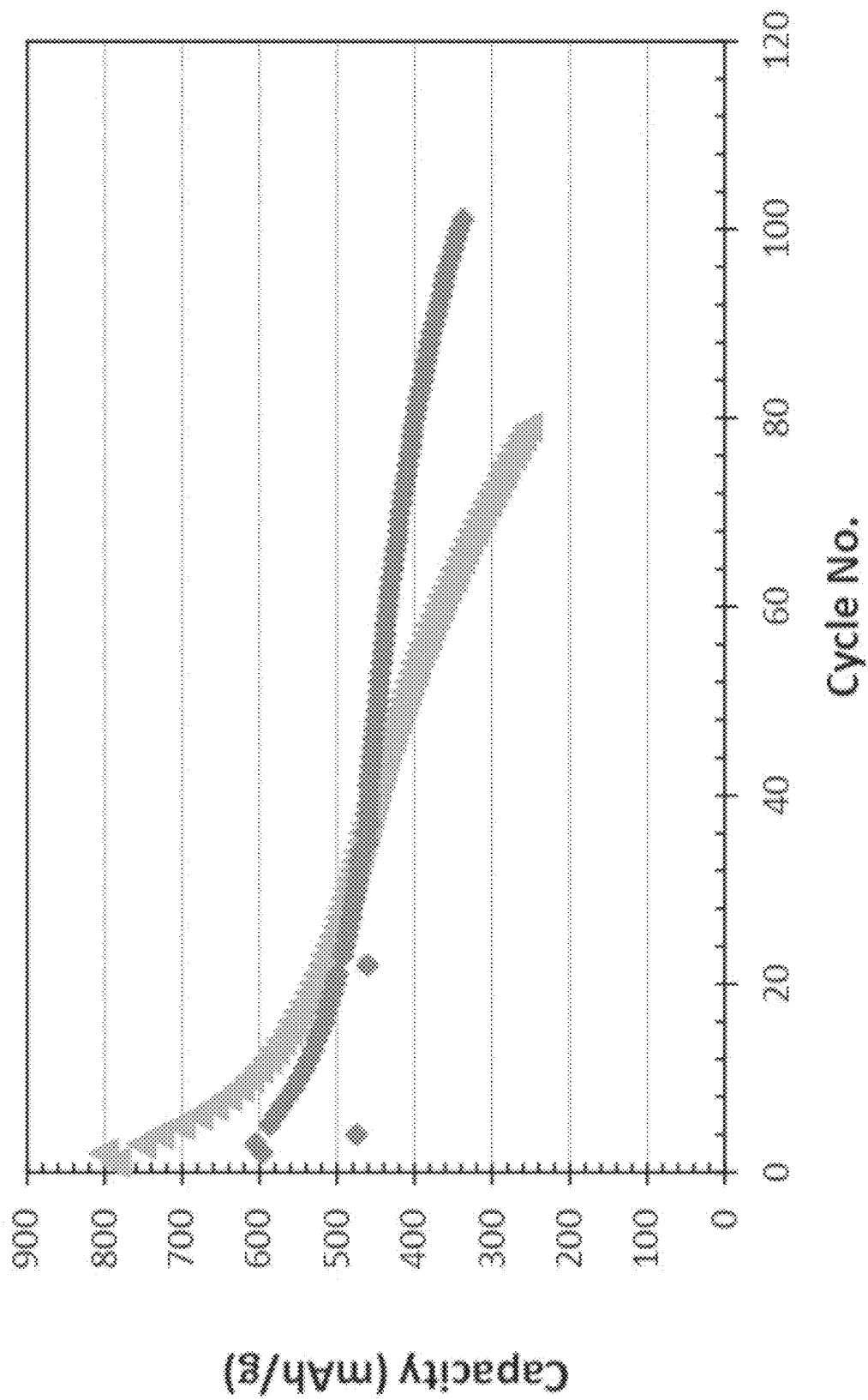
FIG. 12 is a graph comparing two AMOs, one having higher capacity for use in a primary (single use) battery application and the other having higher cyclability for use in a secondary (rechargeable) battery application.

In another example, the AMO material may be used as a battery electrode. A primary (single-use) battery application might desire an AMO with characteristics that lead to the highest capacity, while a secondary (rechargeable) battery application might desire the same AMO but with characteristics that lead to the highest cyclability. FIG. 12 compares the cyclability of two different batteries constructed from AMO materials, including a chlorine containing AMO and a sulfur containing AMO. The AMO material can result in enhanced battery performance, without deterioration of battery components or gas generation (see FIG. 13). This is exactly opposite what the prior art teaches.

Figure 13:
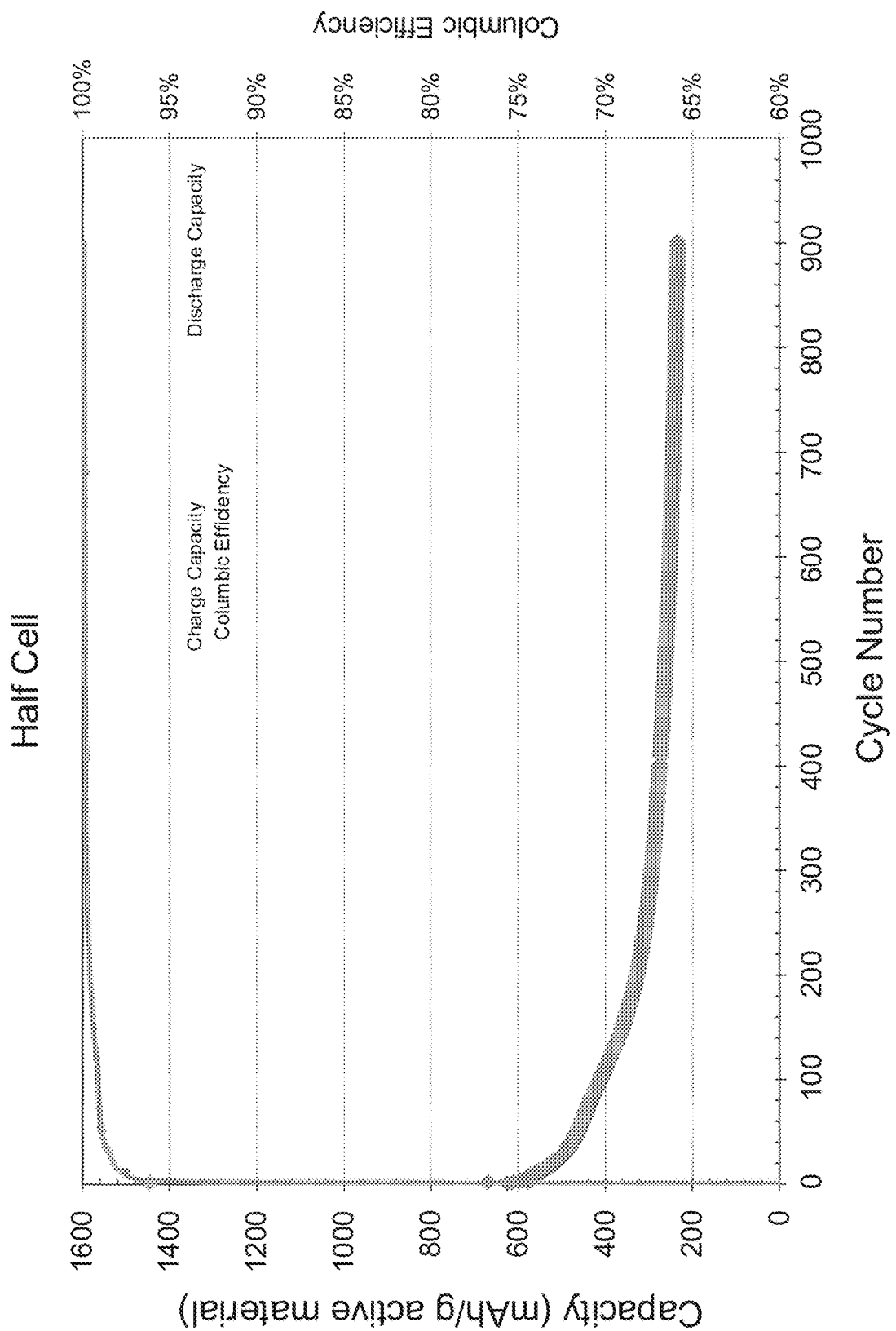
FIG. 13 provides charge and discharge capacity data and Columbic efficiency data, illustrating that AMOs can result in enhanced battery performance, without deterioration of battery components or gas generation.

In FIG. 13, the charge-discharge cyclability of a battery constructed as a half-cell of an AMO nanomaterial electrode versus lithium metal is shown, showing cyclability for up to 900 charge-discharge cycles, while still maintaining useful capacity and exceptional columbic efficiency. Such long cyclability is exceptional, particularly against the lithium metal reference electrode, as lithium metal is known to grow dendrites during even low cycle numbers, which can enlarge and result in dangerous and catastrophic failure of a battery cell.

According to the present disclosure, in a complete cell, the anode 106 comprising a disclosed AMO may be utilized with a known electrolyte 108 and a cathode 104 comprising known materials such as lithium cobalt oxide ($LiCoO_2$). The material comprising the separator 110 may likewise be drawn from those currently known in the art. In another embodiment, the anode 106 may comprise a disclosed non-AMO metal oxide with a known electrolyte 108 and a cathode 104 comprising known materials, and/or constructed according to known methods.

In a complete cell, the cathode 104 comprising a disclosed AMO may be utilized with a known electrolyte 108 and an anode 106 comprising known materials such as carbon on copper foil, which display less electronegativity than AMO's of the present disclosure. The material comprising the separator 110 and electrolyte 108 may likewise be drawn from those currently known in the art as discussed above. In another embodiment, the cathode 104 may comprise a disclosed non-AMO metal oxide with a known electrolyte 108 and an anode 106 comprising known materials, and/or constructed according to known methods.

Various layering and other enhancement techniques may be deployed to maximize capacity for holding lithium ions for powering the cell 100. It should also be understood that a battery based according to the present disclosure can be deployed as a secondary (e.g., rechargeable) battery but can also serve as a primary battery. Although the anodes and cathodes of the present disclosure lend themselves to a reversible battery chemistry, a cell or battery constructed as described herein, may be satisfactorily deployed as a primary cell or battery.

In the battery industry, the word 'formation' is used to denote initial charge or discharge of the battery carried out at the manufacturing facility prior to the battery being made available for use. The formation process is generally quite slow and may require multiple cycles directed at converting the active materials as-manufactured into a form that is more usable for cell cycling. These conversions may be alterations of the structure, morphology, crystallinity, and/or stoichiometry of the active materials.

Cells and batteries constructed according to the present disclosure, in some embodiments, do not require initial formation and therefore are ready to use as primary cells or batteries. In other cases, limited or rapid formation may be employed. Moreover, by deploying the cells and batteries of the present disclosure as primary cells that are not intended to be recharged, some of the safety issues that may be inherent with lithium battery chemistry are mitigated, as it is known in the art that the safety issues more frequently arise during battery cycling. However, following an initial primary discharge, cells and batteries disclosed herein are optionally suitable for use as secondary battery systems which may undergo many charge-discharge cycles, such as up to tens, hundreds, or even thousands of cycles.

In other embodiments according to the present disclosure, the cathode 104 comprises nanoparticles of tin oxide ($SnO_2$) in non-AMO form. The tin-oxide nanoparticles may be substantially monodispersed. Titanium dioxide ($TiO_2$), iron oxide (FeO, $Fe_2O_3$, $Fe_3O_4$), or another metal oxide may be substituted for the tin oxide according to embodiments of the present disclosure. Known electrolytes 108, anodes 106, and separators 110, or those otherwise described in this disclosure may be utilized with such embodiments.

It will be appreciated that other battery constructions are possible using the AMO and non-AMO metal oxides of the present disclosure. For example, a battery may comprise a first electrode comprising a metal oxide of the present disclosure (possibly in monodispersed nanoparticulate form), a second electrode, and an electrolyte positioned between the first electrode and the second electrode. As an example, in a lithium ion battery, the first electrode may operate as a cathode or an anode. For example, in operation as a cathode, the second electrode may correspond to lithium metal, graphite, or another anodic material. As another example, in operation as an anode, the second electrode may correspond to a $LiCoO_2$, $LiMn_2O_4$, $LiNiO_2$, or another cathodic material. Useful materials for the second electrode include, but are not limited to, graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these.

It will be appreciated that the AMO materials disclosed herein may also be added as dopants to conventional lithium ion cell anodes and/or cathodes, such as in amounts between 0.01 wt. % and 10 wt. %, or for example, an amount of about 1 wt. %, 5 wt. % or 10 wt. % of AMO material in an electrode. The disclosed AMO materials provide an incredible capacity for storing lithium atoms and by adding these materials to conventional lithium ion cell electrodes, the ability of these composite. As one specific example, an electrode comprises $LiCoO_2$ and an AMO. As another example, an electrode comprises a carbonaceous material, such as graphite, and an AMO.

The metal oxides of the present disclosure may optionally be used with an acidic component, such as a binder, an acidic electrolyte, or an acidic electrolyte additive. This may be in the context of an anode, cathode, half-cell, complete cell, integrated battery, or other components. The inventors have surprisingly found that including acidic components and/or acidic species, such as organic acids or organic acid anhydrides, in a battery comprising an AMO material results in an increase in the capacity of versus batteries where the acidic species are not included. Again, the prior art teaches against use of acidic species, as these species may degrade metal current collectors and housings and cause deterioration in other electrode components.

Figure 14:
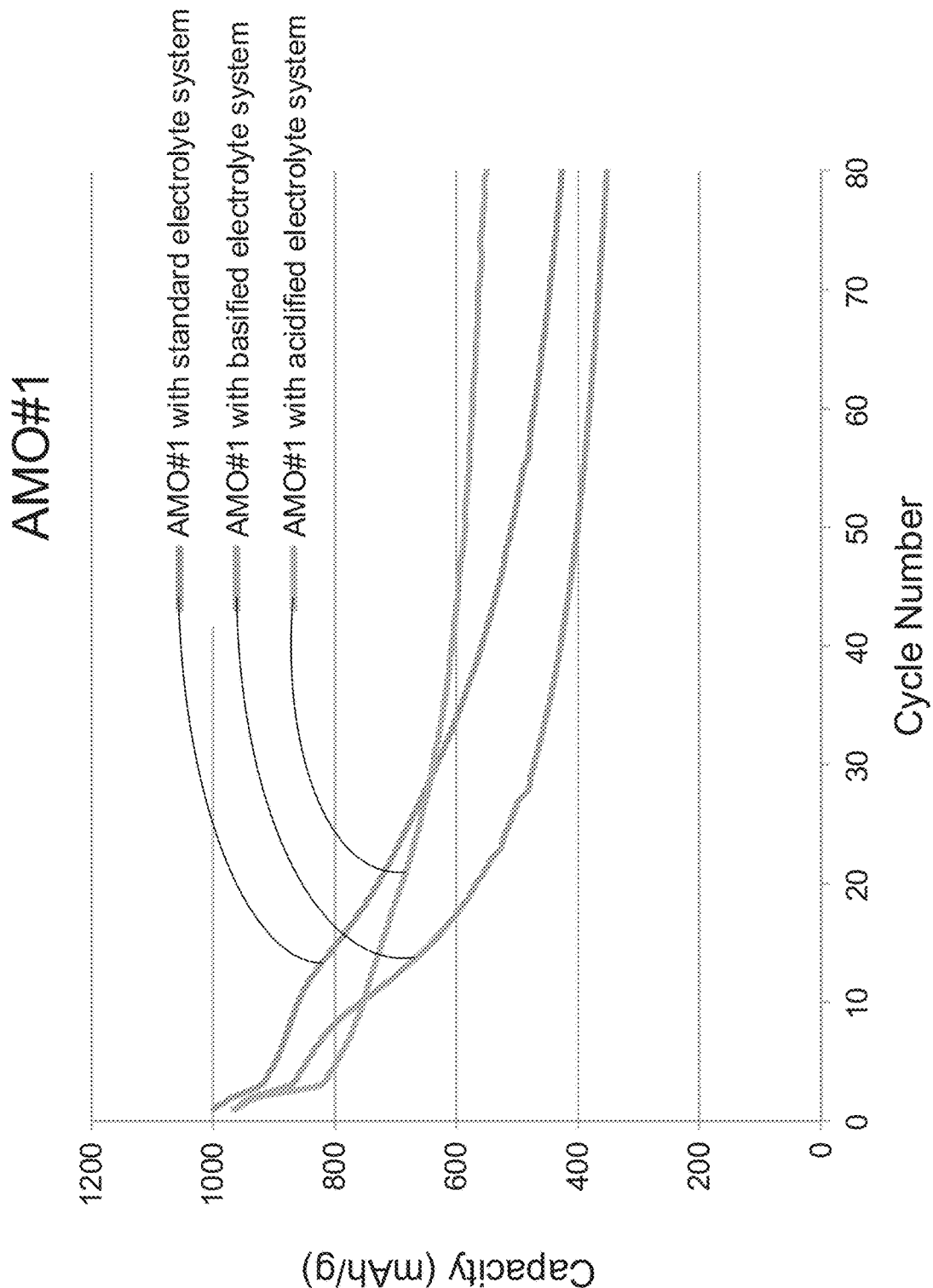
FIG. 14 shows capacity and cycling data for an AMO in standard, acidified, and basified electrolyte systems.

As shown in FIG. 14, which provides comparative cyclability data for AMO-based batteries formed of the same materials and structure except for one having a standard electrolyte, one having a basified electrolyte, and one having an acidified electrolyte. The batteries included a construction as follows: all cathodes included the same AMO material; all anodes were lithium metal; the standard electrolyte was a 1:1:1 mix of dimethylene carbonate, diethylene carbonate, and ethylene carbonate with 1 M $LiPF_6$; the acidified electrolyte was the standard electrolyte with 3 wt. % succinic anhydride; the basified electrolyte was the standard electrolyte with 3 wt. % dimethylacetamide. All batteries were cycled at the same discharge rate. As illustrated, the battery with the acidified electrolyte system exhibits the best cycling ability, maintaining the highest capacity over the largest number of cycles.

Figure 15:
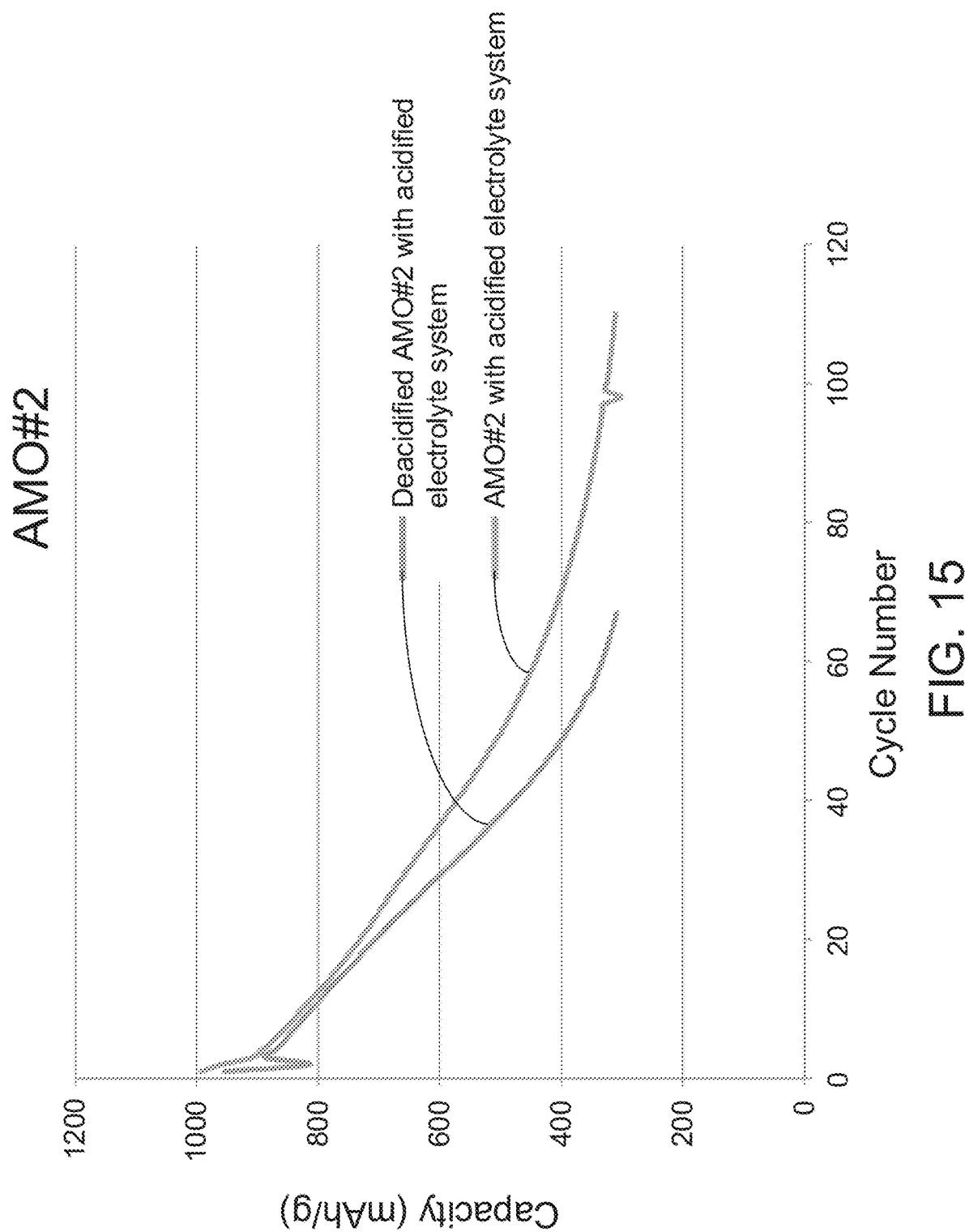
FIG. 15 shows capacity and cycling data for an AMO, and for the same AMO from which the acidification was removed by solvent washing.

FIG. 15 provides additional comparative cyclability data for two different batteries with the same battery construction including an acidified electrolyte, except that the AMO material of one battery is deacidified by washing with a solvent. The batteries included a construction as follows: the cathodes included the AMO material; the electrolyte was a 1:1:1 mix of dimethylene carbonate, diethylene carbonate, and ethylene carbonate with 1 M $LiPF_6$ and 3 wt. % succinic anhydride; the anodes were lithium metal. The batteries were cycled at the same discharge rate. The battery having the acidified AMO material exhibits higher capacity retention vs. cycle number, indicating that the acidified surface of the AMO may interact with the acidified electrolyte, providing enhanced performance.

At the present time, lithium batteries are perceived to be a safety risk in certain situations. For example, airline regulations currently require partial discharge of lithium batteries that are to be carried in the cargo hold. Fires have been reported in devices utilizing lithium batteries resultant from runaway exothermal reactions. Moreover, lithium fires can be difficult to extinguish with popularly deployed fire suppression systems and devices. For these reasons, lithium containing compounds rather than metallic lithium is used in many commercial battery cells.

Use of lithium containing compounds in an anode, rather than lithium metal, may, however, limit the amount of lithium available for reaction and incorporation into the cathode upon discharge, and may thus also limit the capacity of such cells. The presently disclosed AMO materials, however, show not only large uptake of lithium during discharge but also enhanced safety characteristics. For example, when battery cells comprising the AMO material in a cathode and a lithium metal electrode are subjected to safety tests, such as nail penetration tests, shorting tests, and overvoltage tests, the cells perform well and do not appear to pose an unacceptable risk of fire or explosion. This may be because the AMO's passivate lithium metal within a cell or battery. Even using solid or pure lithium as an anode, devices employing AMO's of the present disclosure as a cathode do not appear to pose an unacceptable risk of fire or explosion. The novel safety results may also be due to the low operating voltage of cells constructed according to the present disclosure, which in some embodiments is <1.5 V compared to a traditional lithium ion operating voltage of >3.0 V.

Several cells were constructed with a cathode comprising an AMO ($SnO_2$) according to the present disclosure. The cathode was prepared from a composition of the AMO ($SnO_2$), Ketjen black (KB), polyvinylidene fluouride (PVDF), and polyaryl amide (PAA) at a ratio of 63/10/26.1/0.9 by volume. Double-sided layers of this composition were prepared at 4 mg/cm$^2$ per side. Six of these layers comprised the cathode. The area of the prepared cathode was 9×4 cm$^2$. A separator was obtained from Targray Technology International, Inc. and comprised a 25 μm thick layer of polypropylene. The separator was 9.4×4.4 cm$^2$ in area. An electrolyte was prepared from 1M $LiPF_6$ in a solvent of ethylene carbonate, diethyl carbonate, and dimethyl carbonate in a 1/1/1 ratio by volume. The anode was a 50 μm thick layer of lithium metal of 9.2×4.2 cm$^2$ in area.

Two of the constructed cells were discharged prior to a safety test and found to have an actual capacity of 1.7 Ah, and a specific capacity of 1575 mAh/g $SnO_2$.

Figure 16:
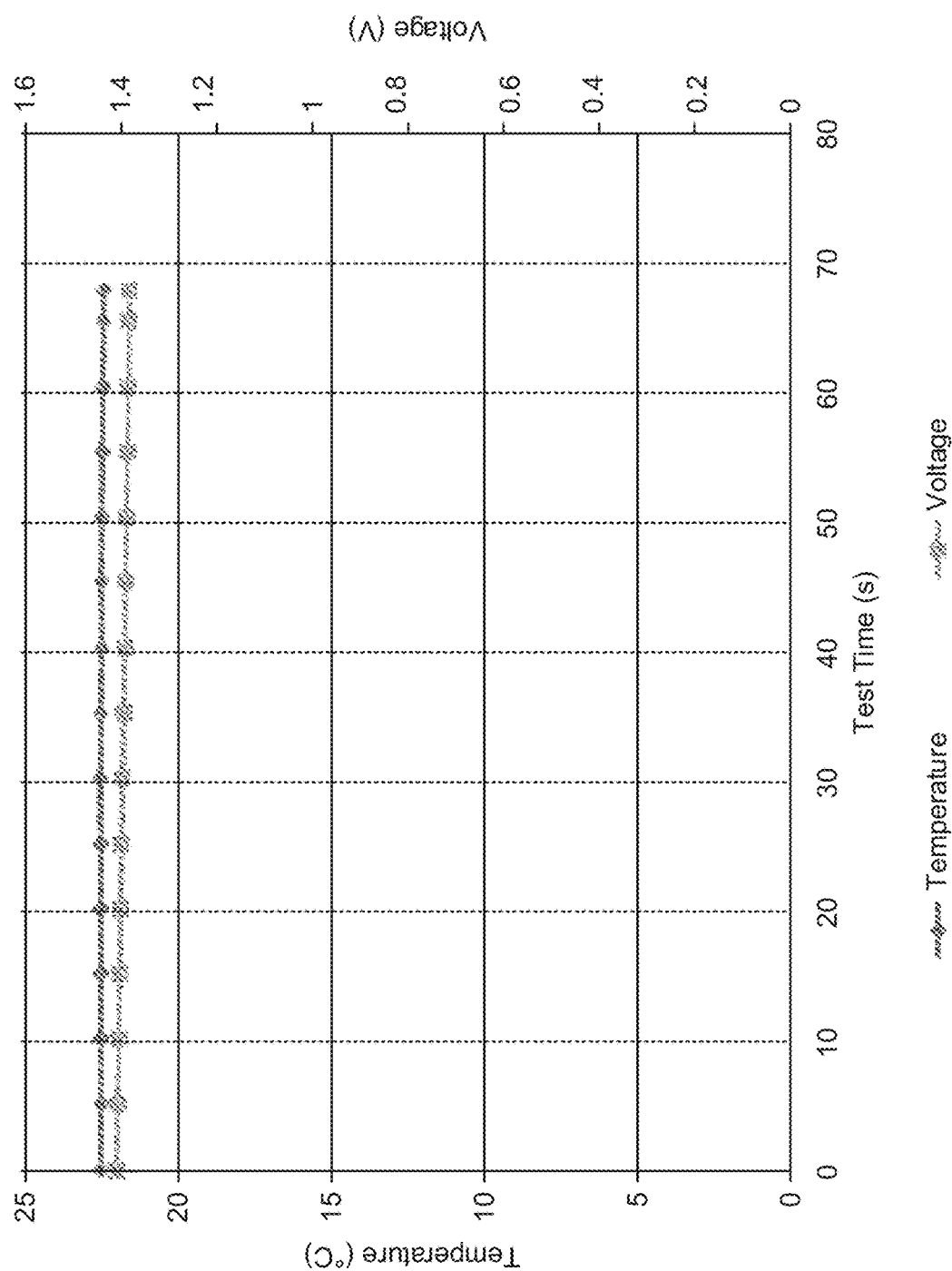
FIG. 16 is a plot of temperature and voltage for a cell constructed according to the present disclosure and subjected to a nail penetration test.

FIG. 16 is a plot of temperature and voltage for a cell constructed as described above and subjected to a nail penetration test. The test was conducted at room temperature and no events (e.g., fires) were observed. It can also be seen that the temperature and voltage remained stable.

Figure 17A:
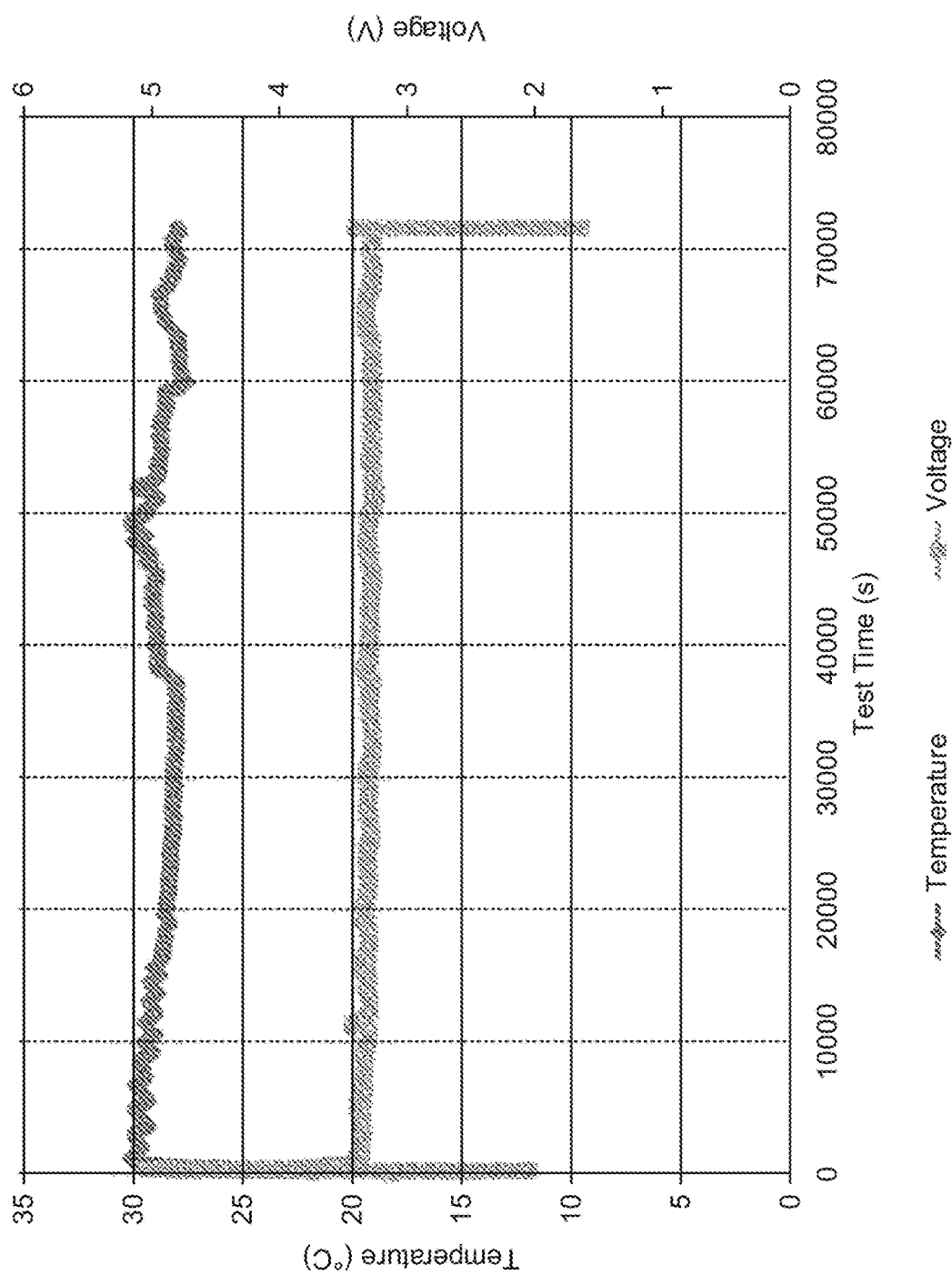
FIG. 17A is a plot of temperature and voltage for a cell constructed according to the present disclosure and subjected to an overcharge test.
Figure 17B:
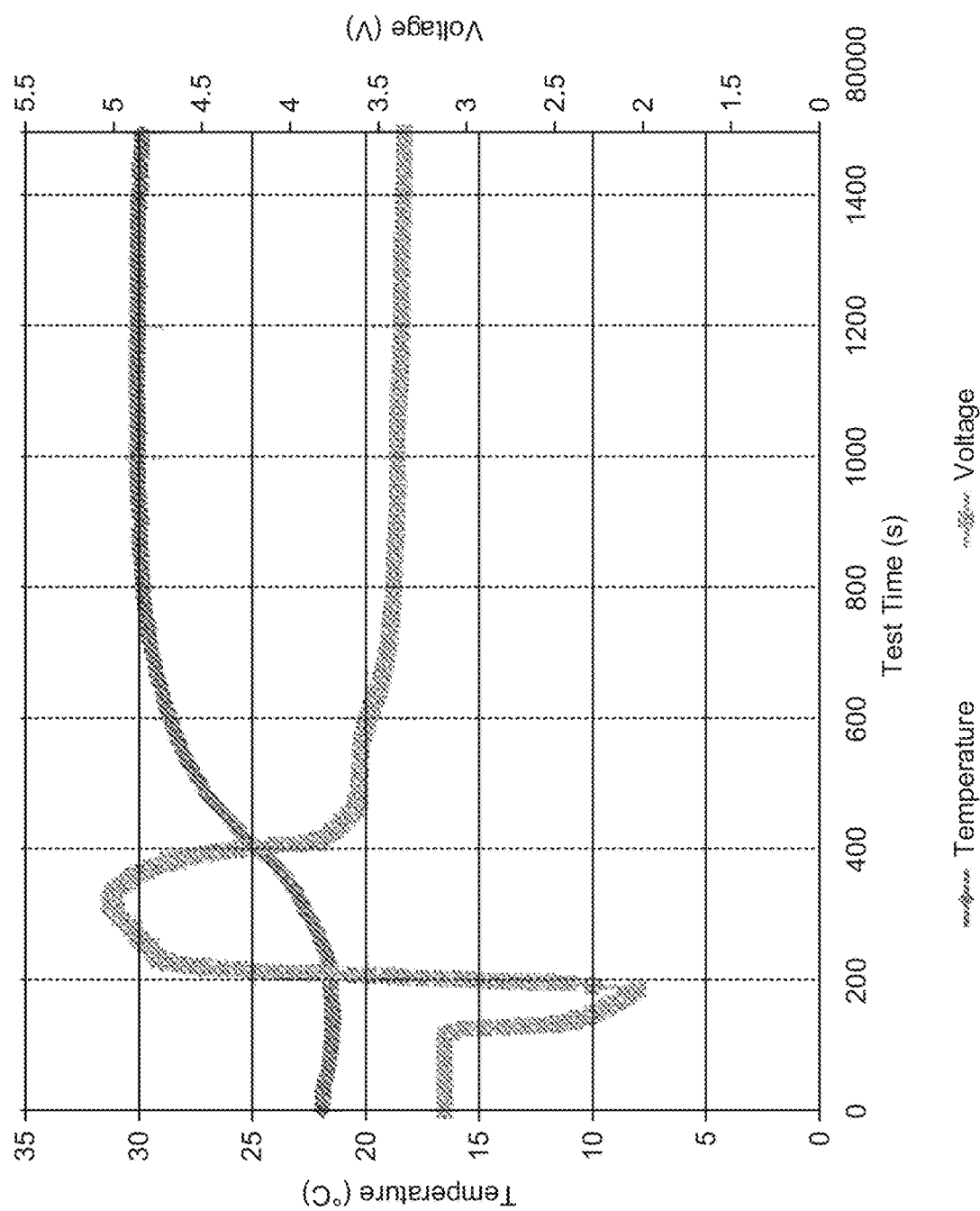
FIG. 17B is a plot of the overcharge test of FIG. 17A focusing on the start of the test.

FIG. 17A is a plot of temperature and voltage for a cell constructed as described above and subjected to an overcharge test. A 1 A current was applied. Apart from some gassing from the cell no adverse events were observed over the timeframe of the test. FIG. 17B is a plot of the overcharge test of FIG. 17A focusing on the start of the test.

It should be understood that the examples constructed for purpose of penetration tests are not intended to be limiting with respect to the entire disclosure herein. Cells and batteries of various sizes, capacities, and materials may be constructed according to the present disclosure. Utilizing the AMO's of the present disclosure, such batteries would reap the benefits of the increased safety demonstrated herein, whether such safety is ultimately due to lithium passivation, lower voltage, or other factors.

Embodiments of constructed electrochemical cells incorporating AMO material as a cathode and lithium as an electrode have been tested to successfully undergo up to 900 or more charge-discharge cycles without resulting in catastrophic and destructive failure. Stated another way, embodiments of constructed electrochemical cells incorporating AMO material as a cathode and lithium as an electrode have been tested to successfully undergo up to 900 or more charge-discharge cycles and still hold a charge and maintain useful capacity.

Without wishing to be bound by any theory, the enhanced safety provided by use of AMO-based cathode materials in lithium cells may arise from the ability of the AMO material to passivate metallic lithium and prevent dendrite formation. The inventors have observed that, upon cycling, the metallic lithium anode did not appear to grow or otherwise form dendrites, but the metallic lithium anode took on a softer and less crystalline appearing structure. In some embodiments, the metallic lithium anode may be passivated, such as by cycling as a component of an electrochemical cell as described herein, and then removed from the electrochemical cell and used as an electrode in a new electrochemical cell with a different cathode. Additionally, cells constructed according to the present disclosure make use of low operating voltages, such as between 1 and 2 volts, which contrasts with the typical voltage of a lithium or lithium-ion battery cell, which operate commonly around 3-4.2 volts. Such a difference in operational voltage may, in part, account for the safety of the disclosed cells.

With respect to construction of cells or batteries using lithium as an anode according to the present disclosure, in some embodiments, the entire anode (100%) is metallic lithium. The metallic lithium may only be substantially pure in that a minute percentage of the anode may comprise trace elements and impurities that do not affect the performance of the cell or battery in a measurable way. In various embodiments, the anode comprises at least 50%, 55%, 60%, 65%, 75%, 80%, 85%, 90%, or 95% metallic lithium.

For purposes of the present disclosure the term "metallic lithium" refers to lithium in its neutral atomic state (i.e., non-ionic state). The term metallic lithium is intended to distinguish over other forms of lithium including lithium ions and lithium compounds. The term metallic lithium may refer to neutral atomic lithium present in mixtures that comprise lithium atoms, such as mixtures of lithium and other elements, compounds, or substances. The term metallic lithium may refer to neutral atomic lithium present in lithium alloys, such as a metallic mixture including lithium and one or more other metals. The term metallic lithium may refer to neutral atomic lithium present in composite structures including lithium and one or more other materials. Electrodes comprising or including metallic lithium may include other materials besides lithium, but it will be appreciated that metallic lithium may correspond to an active material of such an electrode. In some cases, an anode in an electrochemical cell comprises metallic lithium.

For purposes of this disclosure, metallic lithium may be taken to mean lithium that is not reacted with any other element so as to have formed a compound (at least at the time of battery or cell construction). In some embodiments, a portion of the anode may be metallic lithium while a portion of the anode may be a lithium compound containing various percentages of lithium that is reacted with other elements to form a lithium compound. The metallic lithium may be arranged to be segregated geometrically on or in the anode relative to the lithium compound portion of the anode.

Figure 18:
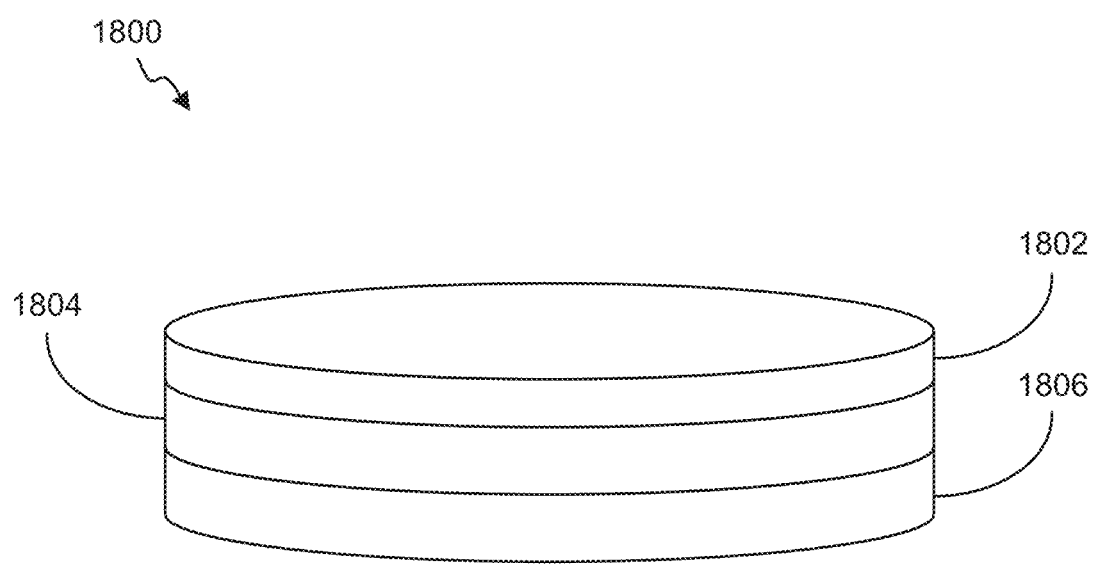
FIG. 18 is a side view of an example cathode according to aspects of the present disclosure.

Referring now to FIG. 18, a perspective view of a cathode 1800 according to aspects of the present disclosure is shown. FIG. 18 is not to scale. The cathode 1800 comprises 33.3% $SnO_2$ in AMO form. The AMO was prepared according to the methods disclosed above. To form a carbon layer 1804 a slurry of Ketjenblack EC-300J (SA: ~800 m2/g) prepared using NMP solvent and coated on copper foil 1802 of thickness 10 μm. The slurry composition was 80% Ketjenblack and 20% PVDF by weight. As coated tape was dried in a vacuum oven at 100° C.

To form a carbon/SnO$_2$ layer 1806 SnO$_2$ (AMO), Ketjenblack and PVDF each 33.3% by weight were mixed together and slurry was prepared by adding NMP solvent and coated on part of the Ketjenblack coated copper foil (1802, 1804). The resultant tape was dried in a vacuum oven at 100° C. (overnight) and calendared at room temperature. Thickness of the tape was measured using a micrometer at SnO$_2$ coated and Ketjenblack (only) coated areas. The thickness of the Ketjen black layer 1804 is about 8 μm; the thickness of the electrode layer 1806 is about 2 μm. The foil layer 1802 is about 10 μm giving a total thickness of the cathode 1800 of about 18 μm.

The calendared tape was punched out into circular discs at Ketjenblack (only) and SnO$_2$ coated areas. The weight of the Ketjenblack disc was subtracted from the SnO$_2$ disc to obtain total mass of the electrode material. In case of one tested cell type, the total mass of the electrode material is 0.0005 g (after subtracting the Ketjenblack disc weight), and the active material content is 0.000167 g (33.3% of total mass).

Some important elements of the cathode 1800 are (1) layering, using a carbon undercoat (2) the use of Ketjenblack high surface area carbon in both undercoat and topcoat (3) the 33% active material topcoat, and (4) the thin (~2 um) topcoat layer. All of these parameters may be further developed.

In some embodiments, carbons other than Ketjenblack are used. Binders other than PVDF may be used. The cathode may be constructed in one or more layers. The percentage of active material may be more or less than 33%. The thickness of the one or more layers may be more or less than 2 um. A variety of current collectors may be used in order to optimize cell construction.

It should be understood that the example above provides one instance of lower active material loading within the electrode than has heretofore been believed to promote optimal performance and capacity. As previous discussed, traditional preferences for active loading are 90%, 95%, or more where possible. According to the present embodiment, active loadings may be less than 80% w/w. In some embodiments, calculation of the active loading percentage may be a total active loading that includes various conductive layers of the electrode. For example, a layer with a higher (but still low according to prior art teachings) active material loading of 33% may provide a total active loading across the electrode of 23% when combined with the conductive layer that contains little or no active material. In various embodiments, the total active material loading of the electrode is less than 63% maximum. In another embodiment, the active material loading in total is between 23% and 33%. In yet another embodiment, the active material loading in total is between 11% and 14%.

Specific energy densities exhibited by materials according to the present disclosure (e.g., AMO SnO$_2$) are on par with those of fossil fuels. This is taught to be impossible by prior art scientific literature. The same effects are observed even with non-AMO metal oxides (e.g., tin oxide, titanium dioxide, and or iron oxide) when constructed as electrodes and batteries according to methods of the present disclosure. This suggests that the operational mechanism of these materials as active materials is outside of that currently known or taught.

As described herein, non-AMO metal oxides may be constructed as electrodes with an active material loading that is substantially lower than taught by the prior art. For example, the active loading may be below 50%, such as 30-40% by weight, 20-25% by weight, or particularly 21% or 33% by weight. Formation of an electrode may be by repeated application of multiple layers of the active material until a desired thickness is reached. Conductive carbon may be layered with the active material as well. The conductive carbon may be applied at the same or different loading density as the active material. For example, the active material and the conductive carbon may both be present at 20-25%, for example, at 21% by weight. In some embodiments, it has been determined that application of the active material in multiple thin layers provides enhanced performance over a single thicker layer.

Figure 19:
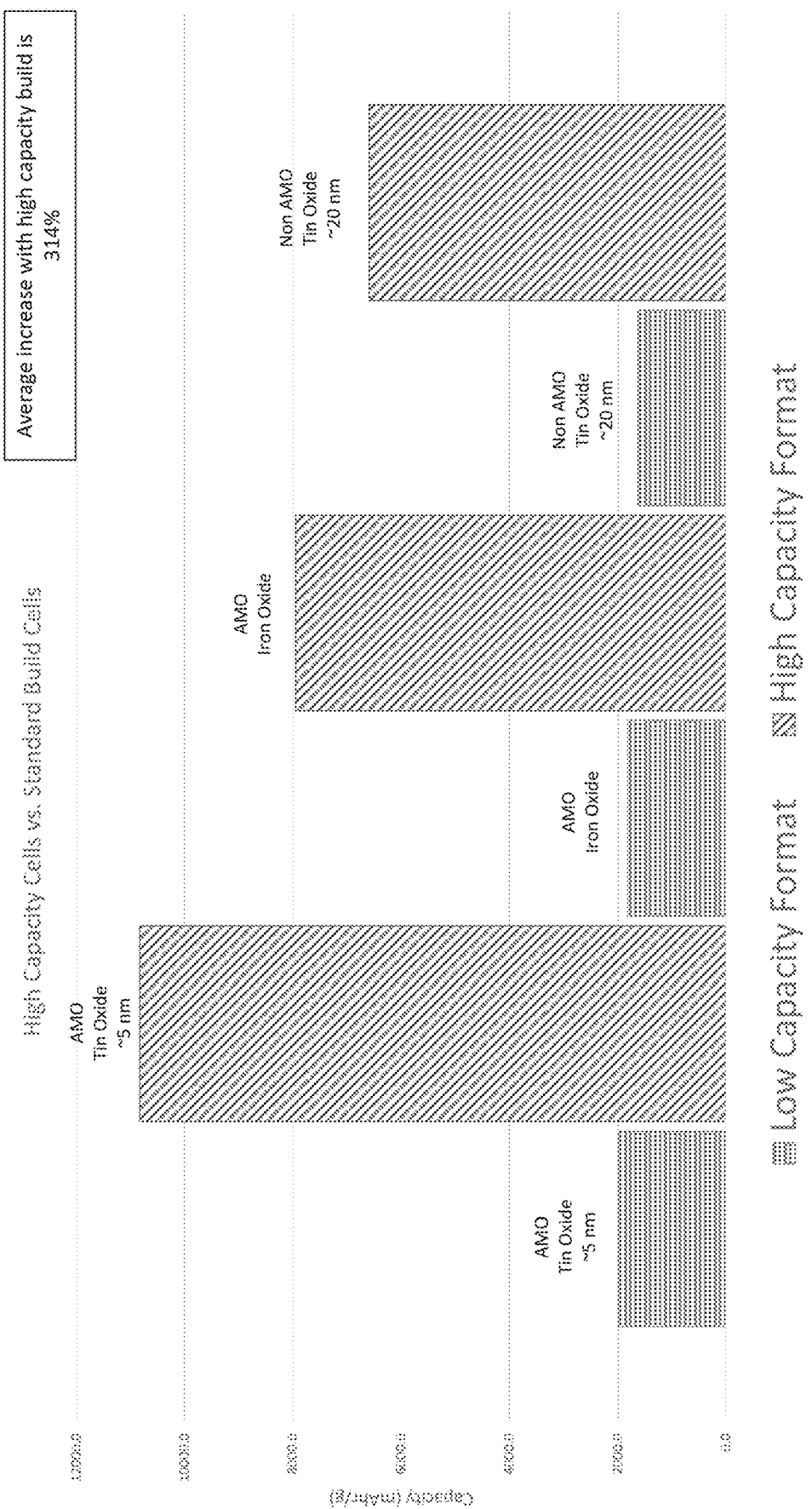
FIG. 19 is a bar graph comparing lithiation capacities of various metal oxides using standard construction techniques compared to construction techniques according to the present disclosure.

Referring now to FIG. 19 a bar graph comparing lithiation capacities of various metal oxides using standard construction techniques compared to construction techniques according to the present disclosure is shown. High active material loading and other standard construction techniques were used in the first instance for AMO tin oxide, AMO iron oxide, and non-AMO tin oxide. The AMO tin oxide particle size was on the order of 5 nm. The non-AMO tin oxide particle size was on the order of 20 nm.

The AMO tin oxide when utilized with standard construction techniques yielded a lithiation capacity of about 2000 mAh/g. When constructed as an electrode with lower active material loading (e.g., around 21% by weight) in a layered arrangement with nanoparticulate conductive carbon (also around 21% by weight), lithiation capacity increased to over 10,000 mAh/g. The increase using AMO iron oxide when subjected to the same test was from slightly less than 2000 mAh/g to around 8000 mAh/g. Non-AMO tin oxide, surprisingly, also increased from less than 2000 mAh/g to more than 6000 mAh/g. The average increase using the high capacity construction method was about 314%.

All references throughout this application, for example patent documents including issued or granted patents or equivalents, patent application publications, and non-patent literature documents or other source material, are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are individually included in the disclosure. As used herein, "and/or" means that one, all, or any combination of items in a list separated by "and/or" are included in the list; for example, "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising," particularly in a description of components of a composition or in a description of elements of a device, is understood to encompass those compositions and methods consisting essentially of and consisting of the recited components or elements. The invention illustratively described herein suitably may be practiced in the absence of any element or limitation that is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

What is claimed is:

1. A battery electrode comprising:
   at least one active material layer containing a nano-particle sized metal oxide in a range of 20% to 40% by weight; and
   at least one conductive layer containing carbon nano-particles in the range of 20% to 40% by weight;
   wherein the metal oxide provides a lithiation capacity of at least 4000 mAhr/g.

2. The battery electrode of claim 1, wherein the at least one active material layer contains the nano-particle sized metal oxide in a range of 20% to 25% by weight.

3. The battery electrode of claim 1, wherein the at least one active material layer contains the nano-particle sized metal oxide at about 21% weight.

4. The battery electrode of claim 1, wherein the at least one active material layer containing a nano-particle sized metal oxide in a range of 20% to 40% by weight comprises a plurality of active material layers containing the nano-particle sized metal oxide in a range of 20% to 40% by weight.

5. The battery electrode of claim 4, wherein the at least one conductive layer containing carbon nano-particles in the range of 20% to 40% by weight comprises a plurality of conductive layers containing carbon nano-particles in a range of 20% to 40% by weight.

6. The battery electrode of claim 5, wherein the active material layers each comprise nano-particle sized metal oxides in a range of 20-25% by weight, and wherein the conductive layers each comprise carbon nano-particles in a range of 20-25% by weight.

7. The battery electrode of claim 6, wherein the active material layers each comprise nano-particle sized metal oxides at about 21% by weight, and wherein the conductive layers each comprise carbon nano-particles at about 21% by weight.

8. The battery electrode of claim 1, wherein the metal oxides are monodispersed.

9. The battery electrode of claim 1, wherein the metal oxide is not an acidified metal oxide.

10. The battery electrode of claim 1, wherein the metal oxide comprises tin oxide.

11. The battery electrode of claim 1, wherein the metal oxide comprises titanium dioxide.

12. The battery electrode of claim 1, wherein the metal oxide comprises iron oxide.

* * * * *